US012606496B2

(12) United States Patent
Ghosh et al.

(10) Patent No.: US 12,606,496 B2
(45) Date of Patent: Apr. 21, 2026

(54) METHOD AND APPARATUS FOR FORMING VARIABLE DENSITY SINTERED CERAMIC USING APPLICATION OF ALTERNATING VOLTAGE TO AQUEOUS CERAMIC SUSPENSION WITH ICE-TEMPLATING

(71) Applicant: Old Dominion University, Norfolk, VA (US)

(72) Inventors: Dipankar Ghosh, Virginia Beach, VA (US); Sashanka Akurati, Norfolk, VA (US); Shizhi Qian, McLean, VA (US)

(73) Assignee: Old Dominion University, Norfolk, VA (US)

( * ) Notice: Subject to any disclaimer, the term of this patent is extended or adjusted under 35 U.S.C. 154(b) by 1096 days.

(21) Appl. No.: 17/591,933

(22) Filed: Feb. 3, 2022

(65) Prior Publication Data

US 2022/0289636 A1 Sep. 15, 2022

Related U.S. Application Data

(60) Provisional application No. 63/159,055, filed on Mar. 10, 2021.

(51) Int. Cl.
| | |
|---|---|
| *C04B 35/00* | (2006.01) |
| *B28B 1/00* | (2006.01) |

(Continued)

(52) U.S. Cl.
CPC .......... *C04B 38/0605* (2013.01); *B28B 1/007* (2013.01); *B28B 7/40* (2013.01); (Continued)

(58) Field of Classification Search
CPC ............................... B28B 1/007; B22C 9/126
See application file for complete search history.

(56) References Cited

U.S. PATENT DOCUMENTS

| | | | | |
|---|---|---|---|---|
| 5,120,477 A * | 6/1992 | Suey | ....................... | C04B 35/80 264/28 |
| 8,562,901 B1 * | 10/2013 | Mah | ...................... | C04B 35/195 264/642 |

(Continued)

OTHER PUBLICATIONS

Novel freeze-casting device with high precision thermoelectric temperature control for dynamic freezing conditions Cathrine D. Christiansen, 2020. https://doi.org/10.1063/1.5134737 (Year: 2020).*

(Continued)

*Primary Examiner* — Alison L Hindenlang
*Assistant Examiner* — Andres E. Behrens, Jr.

(57) ABSTRACT

A method and apparatus for forming variable density ceramic structures, where the method includes: obtaining a ceramic powder having an ultrafine particle size; mixing the ceramic powder into a suspension fluid thus forming a ceramic suspension; providing a mold configured to retain the ceramic suspension; providing a plurality of electrodes about the mold; applying an alternating voltage to the electrodes thus forming alternating electric currents through the suspension thus causing accumulation of ceramic particles on at least one of the electrodes; reducing the temperature of the suspension thus inducing the formation of ice crystals therein necessary for ice-templating; freeze drying the frozen suspension into a porous state; and sintering the ceramic particles into a solid architecture retaining a common final structure with the ceramic particles in the porous state.

16 Claims, 24 Drawing Sheets

(51) Int. Cl.

| | |
|---|---|
| *B28B 7/00* | (2006.01) |
| *B28B 7/40* | (2006.01) |
| *C04B 35/111* | (2006.01) |
| *C04B 35/626* | (2006.01) |
| *C04B 35/64* | (2006.01) |
| *C04B 38/06* | (2006.01) |
| *C04B 38/00* | (2006.01) |

(52) U.S. Cl.

CPC ........ *C04B 35/111* (2013.01); *C04B 35/6261* (2013.01); *C04B 35/6264* (2013.01); *C04B 35/64* (2013.01); *B28B 1/00* (2013.01); *B28B 7/00* (2013.01); *C04B 35/00* (2013.01); *C04B 38/00* (2013.01); *C04B 2235/5436* (2013.01); *C04B 2235/606* (2013.01); *C04B 2235/661* (2013.01); *C04B 2235/666* (2013.01); *C04B 2235/775* (2013.01)

(56) References Cited

U.S. PATENT DOCUMENTS

| | | | | |
|---|---|---|---|---|
| 2002/0183193 | A1* | 12/2002 | Beppu | B01D 53/02 502/232 |
| 2010/0112330 | A1* | 5/2010 | Kuwayama | A61L 27/12 264/28 |
| 2015/0004521 | A1* | 1/2015 | Ramesh | C04B 35/622 428/221 |
| 2017/0100857 | A1* | 4/2017 | Bai | B29C 39/003 |
| 2019/0270221 | A1* | 9/2019 | Driscoll | B29C 35/16 |
| 2020/0115291 | A1* | 4/2020 | Faber | B01D 69/02 |
| 2024/0326125 | A1* | 10/2024 | Ozdoganlar | C04B 35/447 |
| 2025/0214900 | A1* | 7/2025 | Cristh Fonseca Alves | C04B 35/6264 |

OTHER PUBLICATIONS

Fabrication of lamellar porous alumina with axisymmetric structure by directional solidification with applied electric and magnetic fields Yufei Tang https://doi.org/10.1016/j.jeurceramsoc.2015.12.012 (Year: 2016).*

Freeze-cast alumina pore networks: Effects of freezing conditions and dispersion medium S.M. Miller 2015. http://dx.doi.org/10.1016/j.jeurceramsoc.2015.05.012 (Year: 2015).*

Stone Contact (Zirconia Beads Grinding Mead, 1999, hereinafter Stone) (Year: 1999).*

AC electric field-assisted fabrication of ice-templated alumina materials and remarkable enhancement of compressive strength, 2021 Aashanka Akurati https://doi.org/10.1016/j.scriptamat.2021.114264 (Year: 2021).*

Fabrication of lamellar porous alumina with graded structures by combining centrifugal and directional freeze casting, 2018 Yufei Tang https://doi.org/10.1016/j.ceramint.2017.12.120 (Year: 2018).*

Zirconia Beads (https://www.zirconiaballs.com/95-zirconia-beads/) (Year: 2020).*

Bioinspired large-scale aligned porous materials assembled with dual temperature gradients, 2015 Hao Bai DOI: 10.1126/sciadv.1500849 (Year: 2015).*

Mimicking biological architectures via freeze casting, 2022 Zhihui Zeng https://doi.org/10.1016/j.matt.2022.06.044 (Year: 2022).*

Preparation of a Dense/Porous BiLayered Ceramic by Applying anElectric Field During Freeze Casting Yumin Zhang, 2009 DOI: 10.1111/j.1551-2916.2009.0 (Year: 2009).*

* cited by examiner

Reducing the temperature of the suspension thus inducing the formation of ice crystals therein — 130

Removing the electrode without any accumulation of ceramic particles — 134

Removing the suspension fluid from the ceramic particles — 138

Sintering the ceramic particles — 142

Obtaining a ceramic powder having an ultrafine particle size — 110

Mixing the ceramic powder into deionized water thus forming a ceramic suspension — 114

Providing a mold configured to retain the ceramic suspension — 118

Providing a plurality of electrodes about the mold — 122

Applying an alternating voltage to the electrodes thus forming alternating electric currents through the suspension thus causing accumulation of ceramic particles on at least one of the electrodes — 126

342 Short metal sleeve

338 Funnel

350 Digital micrometer

346 Long metal sleeves

322 Thermocouple

330 Circular nut

354 Data logger

334 Threaded rod

Cooling curve

302

30

Insulation 316

Teflon mold 230

Cold finger 310

Chamber 314

Liquid N$_2$ 318

Aluminum plate 326

238

222/226

250 µm

< 50 kHz and > 1000 kHz

Configuration-A 1 kHz, 10 min

238

METHOD AND APPARATUS FOR FORMING VARIABLE DENSITY SINTERED CERAMIC USING APPLICATION OF ALTERNATING VOLTAGE TO AQUEOUS CERAMIC SUSPENSION WITH ICE-TEMPLATING

CROSS-REFERENCE TO RELATED APPLICATIONS

The present application is a continuation of, and claims priority to, U.S. Provisional Application No. 63/159,055 filed on Mar. 10, 2021, the disclosure of which is hereby incorporated by reference in its entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

Sintering of particles to create solid structures having porous qualities.

BACKGROUND

Porous sintered ceramics have a wide variety of uses, however often suffer from limitations with regard to conductive, strength, or other material properties, which can inhibit or otherwise limit their application in various fields of use.

SUMMARY

Contemplated herein is a method and apparatus for forming variable density ceramic structures, the method including the steps of: obtaining a ceramic powder having an ultrafine particle size; mixing the ceramic powder into a suspension fluid thus forming a ceramic suspension solution; providing a mold configured to retain the ceramic suspension solution; providing a plurality of electrodes about the mold; applying an alternating voltage to the electrodes thus forming alternating electric currents through the suspension solution thus causing accumulation of ceramic particles on at least one of the electrodes; reducing the temperature of the suspension solution thus inducing the formation of ice crystals therein necessary for ice-templating, the ice crystals forming sufficient for ice-templating; removing at least one electrode not having ceramic particles formed thereon; drying the ceramic particles accumulated on the electrode into a porous accumulated state; and sintering the ceramic particles into a solid architecture retaining a common final structure with the ceramic particles in the porous accumulated state.

In some embodiments, ultrafine particle size can be defined as when the ceramic powder has a particle size of less than 5 μm, however, in some preferred embodiments the ultrafine particle size can be defined as when the ceramic powder has a particle size of approximately 1 μm.

In some embodiments, the suspension fluid can be provided as deionized water. In some preferred embodiments, the suspension fluid can also contain an anionic dispersant.

In some additional embodiments the method can include various additional steps, including: providing a milling material to the suspension solution; performing a mixing cycle; and removing the milling material from the suspension solution. In some such embodiments the milling material can be provided as 5 mm spheres of zirconia.

In yet additional embodiments, one of the electrodes can be configured to act as a cold finger. Wherein in some such embodiments the method can include various additional steps, including: reducing the temperature of the cold finger below the freezing point of the suspension fluid. In some such embodiments, this can be achieved by: exposing the cold finger to liquid nitrogen; and varying the size of the ice crystals and a freezing rate of the suspension fluid by varying a distance between the cold finger and the liquid nitrogen. In some such embodiments, during the step of reducing the temperature of the solution a ΔT defined as the difference in temperature between the cold finger and an opposing electrode is maintained between 30° C. and 80° C.

In yet additional embodiments, the drying can be performed via exposure to freeze drying conditions of the suspension fluid.

In yet additional embodiments, the mold can be formed of PTFE Fluoropolymer.

In some additional embodiments, the applying of alternating voltages to the electrodes can then be performed at 100-190 volts. In some such embodiments, the alternating voltages can then be applied at 0.1-2000 kHz. Further, the time of the application of these alternating voltages can have a varying duration, such as between 3-10 minutes.

In yet additional embodiments the ceramic powder to suspension fluid ratio can be 1% wt. Or in alternative embodiments, the ceramic powder to suspension fluid ratio can be between 20-35% vol. % solid loadings.

BRIEF DESCRIPTION OF THE DRAWINGS

In order to clearly illustrate various embodiments of the disclosure, the following section provides a brief description of the attached drawings, which are for illustrative purpose only. For those of ordinary skills in the art, other drawings of other embodiments may become apparent based on these drawings wherein:

FIG. 1 illustrates a flowchart of an exemplary method for forming variable density sintered ceramic using application of alternating current to aqueous ceramic suspension during ice-templating according to some embodiments of the present disclosure;

DETAILED DESCRIPTION

Figure 2:
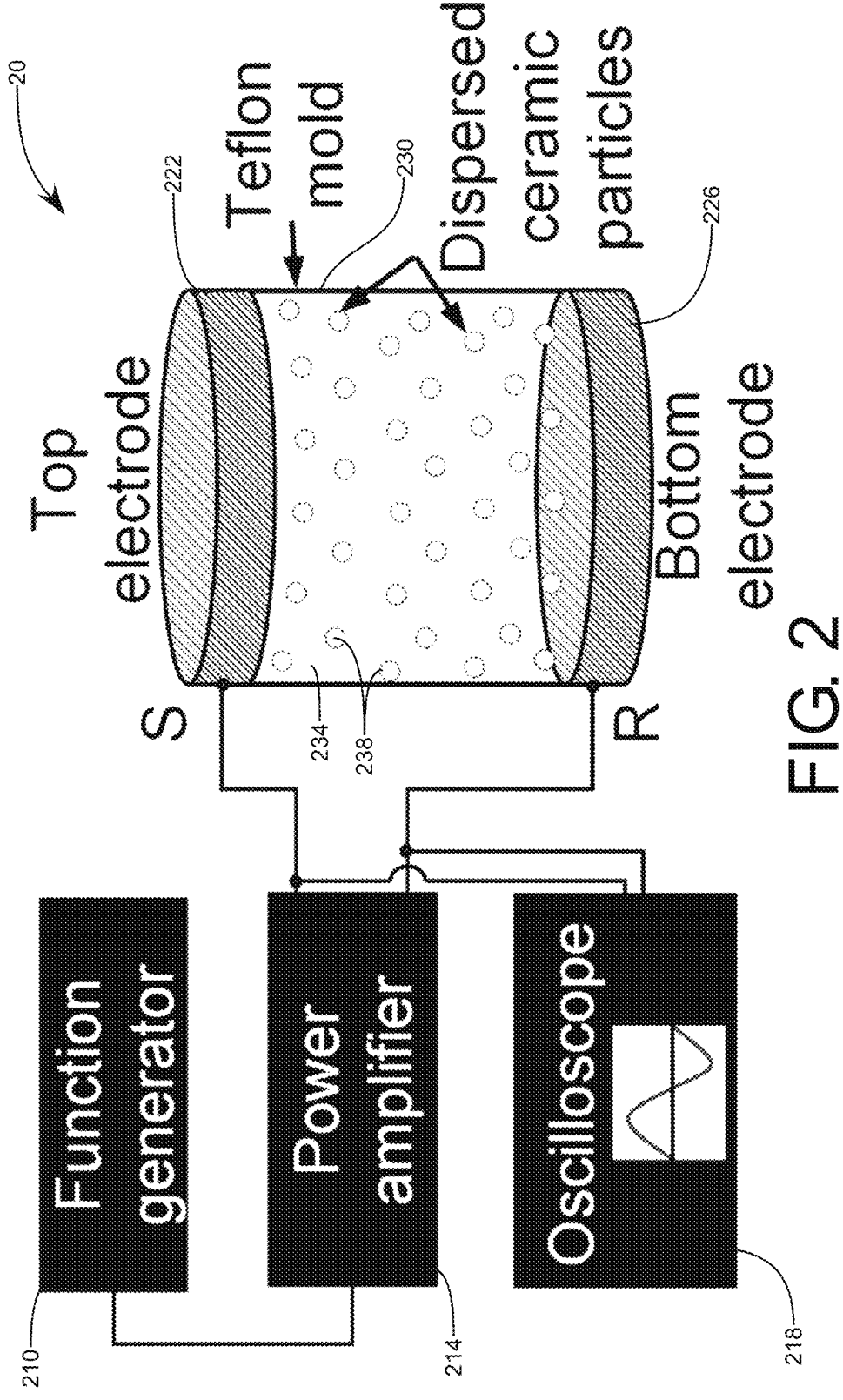
FIG. 2 illustrates an exemplary schematic of a portion of an exemplary device configured to perform various of the steps illustrated in the method depicted in FIG. 1 being illustrative of various embodiments of the present disclosure.

Porous sintered ceramics have a wide variety of uses, however often suffer from limitations with regard to strength or other structural properties of the porous channels that can inhibit or otherwise limit their application in various fields of use. In particular, $Al_2O_3$, SiC, and $Si_3N_4$, is typically utilized in structural elements, armor, impact protection, thermal insulation, catalyst support, filtration, and composites; YSZ is typically utilized in membrane support, solid oxide fuel cells; $TiO_2$ is typically utilized for photocatalysis; HA, and TCP is typically utilized in biomedical applications; LTO, and LCO are typically utilized in solid-state battery electrodes; $BaTiO_3$ is typically utilized in capacitors and resistors; $Fe_2O_3$ is typically utilized in $H_2$ storage and transportation; and $ZrB_2$ and ZrC are typically utilized in aerospace technologies. It should be appreciated that this is not an exhaustive list, but merely an illustrative listing of various known and common applications of various ceramics. For example, LTO and LCO porous structures have limitations for electrode applications because the structures typically formed during the sintering process do not provide adequate conductivity due to the restriction of suitable complete channels through the structure.

Contemplated herein is a system which utilizes application of an alternating current (AC) voltage to the electrodes and the migration of suspended particles with respect to the location of the electrodes when applied to the ceramic suspension prior to an ice templating operation which can then achieve predictable porosity and structural arrangements in previously near random structures provided by previous sintering methods of various ceramic structures.

In particular, FIG. 1 illustrates a flow chart showing a method 10 for forming variable density ceramic structures, the method including the steps of: obtaining a ceramic powder having an ultrafine particle size 110; mixing the ceramic powder into a suspension fluid thus forming a ceramic suspension solution 114; providing a mold configured to retain the ceramic suspension solution 118; providing a plurality of electrodes about the mold 122; applying an alternating voltage to the electrodes thus forming alternating electric currents through the suspension solution thus causing accumulation of ceramic particles on at least one of the electrodes 126; reducing the temperature of the solution thus inducing the formation of ice crystals therein 130; removing at least one electrode not having ceramic particles formed thereon 134; drying or otherwise removing the suspension fluid from the ceramic particles 138 so as to leave the ceramic particles accumulated on the electrode in a porous accumulated state; and sintering the ceramic particles 142 so as to bind them into a solid architecture substantially retaining a common final structure with the ceramic particles in the porous accumulated state.

In some embodiments, ultrafine particle size can be defined as when the ceramic powder has a particle size of less than 5 μm, however, in some preferred embodiments the ultrafine particle size can be defined as when the ceramic powder has a particle size of approximately 1 μm.

In some embodiments, the suspension fluid can be provided as deionized water. In some preferred embodiments, the suspension fluid can also contain an anionic dispersant.

In some additional embodiments the method can include various additional steps, including: providing a milling material to the suspension solution; performing a mixing cycle; and removing the milling material from the suspension solution. In some such embodiments the milling material can be provided as 5 mm spheres of zirconia.

In yet additional embodiments, one of the electrodes can be configured to act as a cold finger. Wherein in some such embodiments the method can include various additional steps, including: reducing the temperature of the cold finger below the freezing point of the suspension fluid. In some such embodiments, this can be achieved by: exposing the cold finger to liquid nitrogen; and varying the size of the ice crystals and a freezing rate of the suspension fluid by varying a distance between the cold finger and the liquid nitrogen. In some such embodiments, during the step of reducing the temperature of the solution a ΔT defined as the difference in temperature between the cold finger and an opposing electrode is maintained between 30° C. and 80° C.

In yet additional embodiments, the drying can be performed via exposure to freeze drying conditions of the suspension fluid.

In yet additional embodiments, the drying can be performed via placement into an oven at sub-sintering temperatures so as to evaporate the suspension fluid.

In yet additional embodiments, the mold can be formed of PTFE Fluoropolymer.

In some additional embodiments, the applying of alternating voltages to the electrodes can then be performed at 100-190 volts. In some such embodiments, the alternating voltages can then be applied at 0.1-2000 kHz. Further, the time of the application of these alternating voltages can have a varying duration, such as between 3-10 minutes.

In yet additional embodiments the ceramic powder to suspension fluid ratio can be 1% wt. Or in alternative embodiments, the ceramic powder to suspension fluid ratio can be between 20-35% vol. % solid loadings.

For purposes of illustration, various exemplary applications of the process will be discussed so as to provide illustrations and context in portraying the various capabilities and uses of the apparatus and methods contained herein. As such, in one such exemplary application, commercially available ultrafine alpha-alumina (α-Al$_2$O$_3$, d$_{50}$=0.3 μm) powder was used. For purposes of brevity, this powder will then be referred to as UA for the remainder of the document. Aqueous suspensions can be prepared over a range of ceramic content. In this exemplary application, aqueous suspensions were prepared of 20, 26 and 35 vol. % solid loadings, i.e., ceramic content in aqueous media. These suspensions will then be referred to as UA-20, UA-26, and UA-35.

FIG. 2 schematically illustrates a schematic of a portion of an exemplary voltage application apparatus 20 for the exemplary applicational setup that was used to apply an alternating voltage to the electrodes to aqueous ceramic suspension through two co-axial parallel metal electrodes of the same dimensions. This exemplary apparatus 20 can include a function generator 210, a power amplifier 214, and an oscilloscope 218 for delivering voltage to a top or first electrode 222 and a second or bottom electrode 226 having a mold 230 provided therebetween, wherein the mold 230 is configured to hold a suspension fluid 234 and ceramic particles 238 suspended therein during ice-templating and accumulation steps. In this exemplary application, the mold 230 was made out of a hollow Teflon™ tube of 18.5 mm inner diameter and the top, i.e., first, and bottom, i.e., second, electrodes which in this exemplary embodiment were made out of 1018 low carbon steel. For each exemplary application, the mold 230 was completely filled with suspension fluid 234 by pouring suspension from the top and then the top/first electrode 222 was inserted onto or over the mold 230, which removed excess suspension and ensured that both electrodes were in complete contact with the suspension. The gap between the two parallel electrodes was 18 mm.

Figure 5:
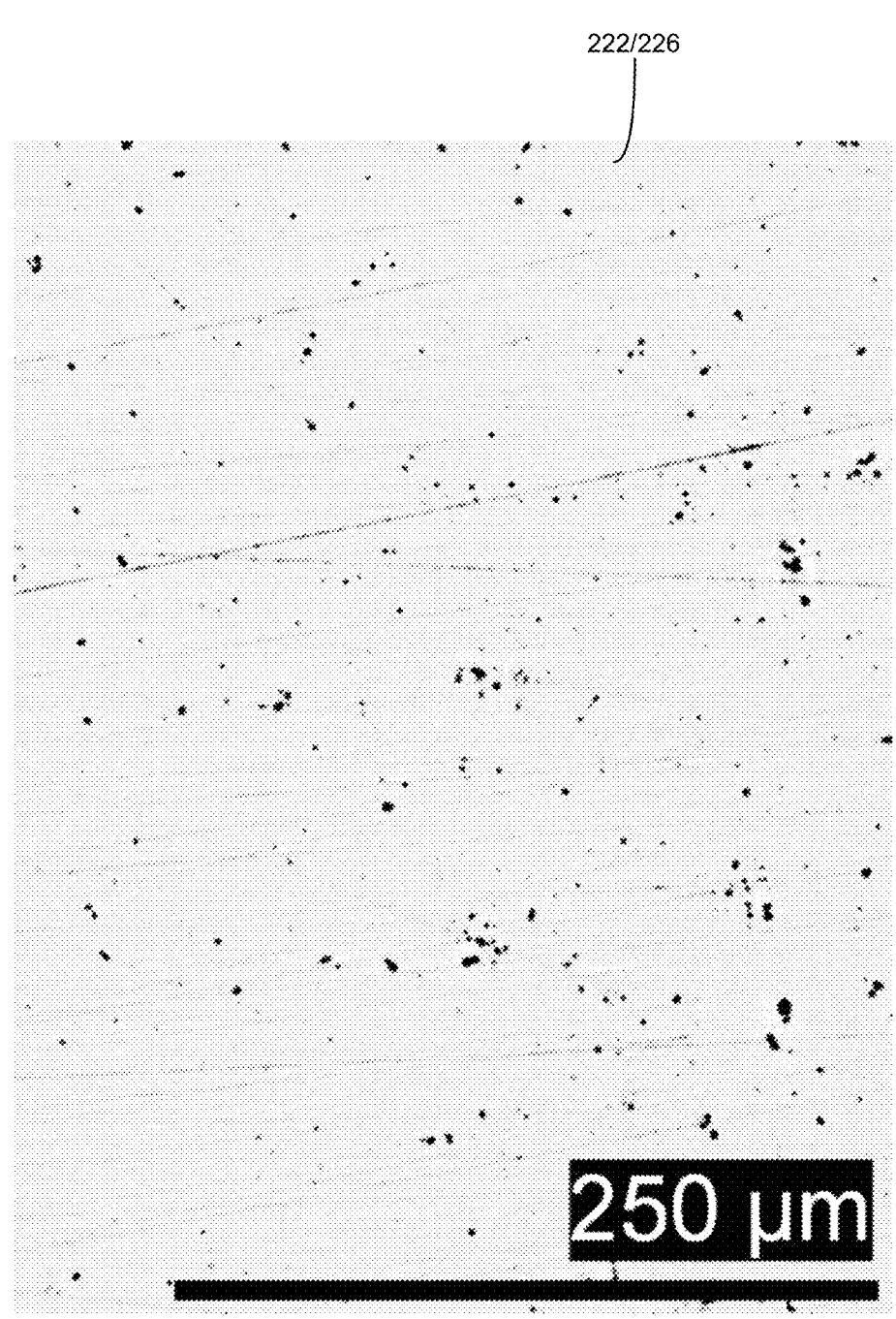
FIG. 5 illustrates a scanning electron microscope image of an exemplary polished electrode surface for use in the device of FIGS. 2-3.

In this exemplary application, electrode surfaces were prepared by first grinding with 120, 320, and 600 grit silicon carbide (SiC) papers and then polishing with 1200 grit SiC paper. Before each exemplary application, mass of both electrodes was measured. An optical micrograph of the final polished electrode surface is shown in FIG. 5. During each exemplary application, the steel electrodes were held firmly against the Teflon™ tube by an external clamp fixture (not shown in FIG. 2). As shown in FIG. 2, the setup to apply an alternating voltage to the electrodes to a ceramic suspension is consisted of a function generator and a voltage amplifier, whereas voltages across the electrodes during the exemplary applications were monitored through an oscilloscope. Here, the electrode attached to the terminal supplying the alternating signal is referred to as source electrode (S), whereas the other electrode is referred to as reference electrode (R). During each exemplary application, temperature change in the top/first electrode with time was measured through the thermocouple 322 attached on the electrode. Temperature change in the electrode is considered as a measure of the temperature change in ceramic suspension.

Figure 4:
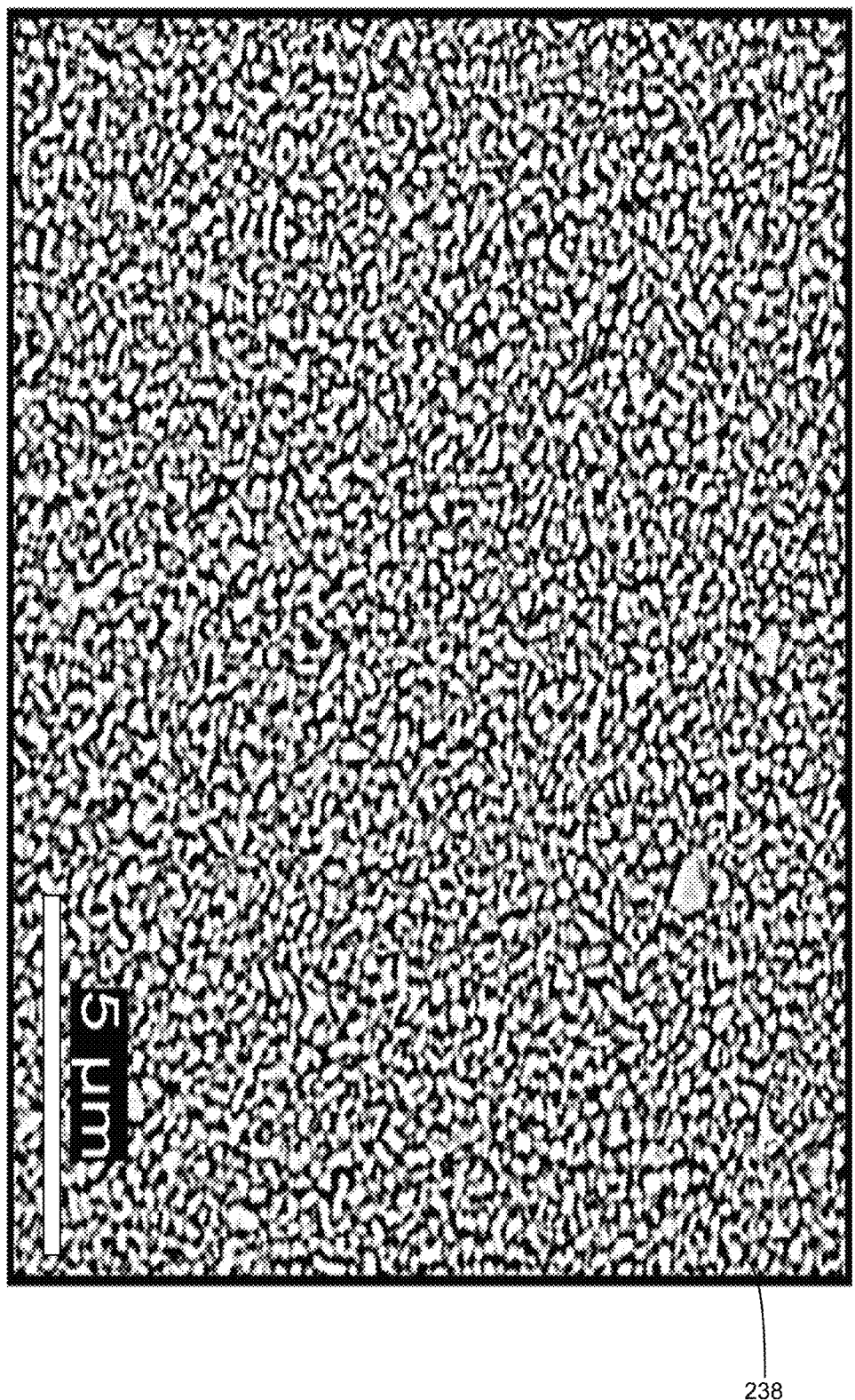
FIG. 4 illustrates a scanning electron microscope image of an exemplary sample of ultrafine ceramic powder for mixing with the suspension fluid as outlined in the method depicted in FIG. 1.

Each ceramic suspension, i.e., suspension fluid 234 with ceramic particles 238 suspended therein, was prepared in a container using the following methodology. First, for each material, the required quantity of ceramic powder was mixed with deionized (DI) water containing 1 wt. % anionic dispersant ammonium polymethacrylate. Next, each suspension was milled for 24 h using zirconia (ZrO$_2$, 5 mm diameter) spheres. At the end of the mixing cycle, the suspension was sieved to separate the milling media, and then de-aired in vacuum (pressure 0.1 MPa) for 30 minutes. From the aqueous suspension, a few drops were taken on a carbon tape, which was then dried in an oven at 120° C. for 2 hours and used for microscopy for particle size. FIG. 4 shows scanning electron microscope image of dried UA powder sample, confirming ultrafine particle size (<1 μm).

AC voltage to the electrodes exemplary applications were performed at various frequencies, in this application a sinusoidal wave form, in the range of 0.1-2000 kHz. For all the exemplary applications in the frequency range of 0.1-1000 kHz, aqueous ceramic suspensions were initially subjected to peak-to-peak voltage (Vpp) of 190 V. In this frequency range, exemplary applications were performed at 0.1, 1, 10, 25, 50, 75, 100, 250, 500 and 1000 kHz frequencies. Whereas for frequencies of 1500 and 2000 kHz, Vpp was 130 V and 100 V, respectively. In these parametric studies, voltage to the electrodes was applied for 10 minutes. For each frequency, five exemplary applications were repeated. Further parametric studies were conducted at frequencies of 1, 100 and 250 kHz, where duration of voltage to the electrodes was varied. These exemplary applications were performed for all three compositions.

After the completion of each exemplary application, the electrode on which ceramic particles accumulated was carefully removed from mold and placed in an oven for 1 h at 140° C. for drying, i.e., at sub sintering temperatures for drying via evaporation. After complete drying, mass of electrode with ceramic particles was measured. The difference in the weight of the electrode after and before the exemplary application provided the mass of ceramic particles accumulated on the electrode surface.

To understand the effects of alternating voltage to the electrodes on ice-templated microstructure, materials were fabricated without and with the use of field. In the preliminary studies, ice-tem plated materials were fabricated only from UA-26 (26 vol. % $Al_2O_3$) suspensions. A set of UA-26 suspensions were directly ice-templated. Whereas, for another set of UA-26 suspensions, alternating field or voltage application was first applied to the suspensions followed by ice-templating. In these exemplary applications, electrode configuration was such that particles migrated toward the bottom/second electrode. Therefore, by moving the particles toward the bottom/second electrode, concentration of suspension near the bottom/second electrode was increased.

Figure 3:
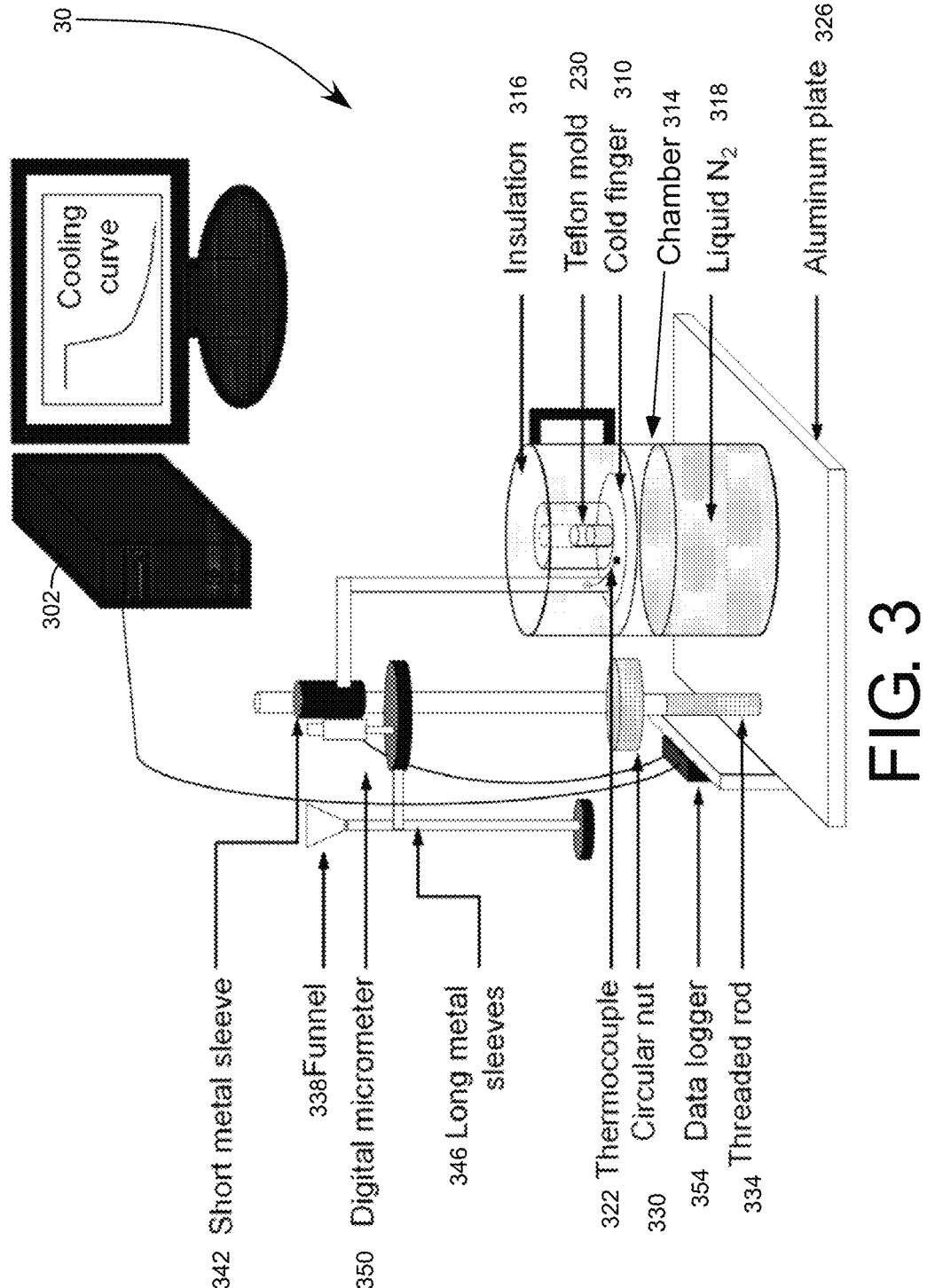
FIG. 3 illustrates an exemplary schematic of an exemplary device configured to perform various of the steps illustrated in the method depicted in FIG. 1 being illustrative of various embodiments of the present disclosure.

A schematic of an exemplary setup for a device 30 configured for use in an exemplary ice-templating application is shown in FIG. 3. In this exemplary setup, a Teflon™ tube used as a mold 230 is placed on a thin plate ("Cold-finger") 310 and filled with suspension, which can be provided as a steel or copper. Therefore, suspension remains in direct contact with the thin plate. However, in this exemplary embodiment, the Teflon™ mold used for voltage to the electrodes exemplary applications was also used for ice-templating. Therefore, a Teflon™ mold, with an exemplary bottom steel electrode 226 inserted, was filled with ceramic suspension and placed on the Cold-finger 310. For these exemplary applications, voltage was first applied, the top/first electrode 222 was then removed, and the rest of the mold was placed on the Cold-finger 310.

To freeze the suspension in the mold unidirectionally, the entire assembly, mold 230 and Cold-finger 310, was inserted inside a liquid nitrogen ($N_2$) chamber 314 but placed above the liquid $N_2$ 318 contained therein and encapsulated by insulation 316. It is assumed that as the temperature of the thin plate reaches below 0° C., ice crystals nucleate at the bottom of the suspension in contact with Cold-finger and grow upward under the influence of the thermal gradient. A thermocouple 322 attached on the thin plate measures temperature change of the plate during freezing. In this exemplary embodiment, it was assumed that thin plane and steel electrode were at similar temperatures throughout an exemplary application. Thus, when the temperature of the steel electrode reached below 0° C., ice crystals nucleated. The thermocouple can be connected to a controller 302 and an aluminum plate holding the liquid $N_2$ chamber 314, wherein the height, or gap between the cold finger 310 and the liquid $N_2$ can be controlled by adjusting the height of the aluminum plate 326. For purposes of enablement, an example of how this can be achieved can be embodied by providing a threaded rod 334 through a circular nut 330, wherein the threaded rod 334 can then be spun using a motor or actuator and controlled by the controller 302.

By adjusting a gap, or distance, between the Cold-finger 310 and liquid $N_2$ 318, unidirectional freezing front velocity (FFV, growth rate) can be monitored and controlled. In one exemplary application, it was found that application of voltage caused temperature rise in the suspensions. Therefore, ice-templating was done first for the suspensions where voltage was applied. Since suspension temperature was above room temperature, for the same gap, FFV was lower compared to suspensions where field was not applied. Therefore, for each counterpart suspension, i.e., with no field, the gap between the thin plate and liquid $N_2$ was adjusted to achieve the same FFV.

In the exemplary ice-templating device of FIG. 3, the main components of this custom-made device are a liquid nitrogen (L-N2) Dewar, a thin steel plate (cold finger, thickness ~0.5 mm), and a cryogenic temperature measurement system that records temperature changes in the cold finger during ice-templating. Long metal sleeve 346 with funnel 338 is used to fill L-N2 in the Dewar and measure the L-N2 level within the Dewar, and digital micrometer 350 is used to adjust the gap in between the L-N2 top surface and the cold finger. An average FFV is estimated for each experiment using the time-temperature data obtained from the T-type thermocouple attached on the cold-finger. Average FFV is estimated by dividing the frozen sample height (measured after removal of the sample from the mold) with the time required to complete the solidification (i.e., the time difference in between the end time and start time of the freezing process). In some embodiments an intermediate data logger 354 can be remotely coupled to the controller 302, or the controller can be provided with a non-transitory computer-readable medium and computer instructions contained thereon to provide both data logging and control operations.

In one exemplary application, frozen samples were freeze-dried in a freeze-dryer for 96 h at a pressure of 0.014 mbar and temperature of –50° C. Freeze-dried samples were sintered at 1550° C. for 4 hours in an air atmosphere inside a box furnace. However, it has also been recognized that a tube furnace could also be utilized and achieve similar results.

Porosity of sintered $Al_2O_3$ cylinder samples were estimated from the measurements of mass and dimensions. For purposes of verification, various samples were sectioned into thin (about 1 mm thickness) disks, and porosity measurement of these disks provided porosity variation along the height of the samples. Microstructure in the sintered materials was investigated using a desktop scanning electron microscope. Both horizontal and vertical cross-sections of sintered samples were viewed under SEM for microstructure analysis.

From several sintered samples, 3 mm thick disk at a height of 5 mm from the bottom of the samples was extracted for uniaxial compression test. Samples were compressed at a displacement rate of 0.5 mm/min (resulting in strain rate of $10^{-3}$/s) using a mechanical testing machine. In this setup, the upper compression platen is attached to a spherical seat for improved alignment and ensuring even pressure across the entire surface of the specimen. During each exemplary application, surfaces of compression platens in contact with specimen surfaces were lubricated.

Figure 10A:
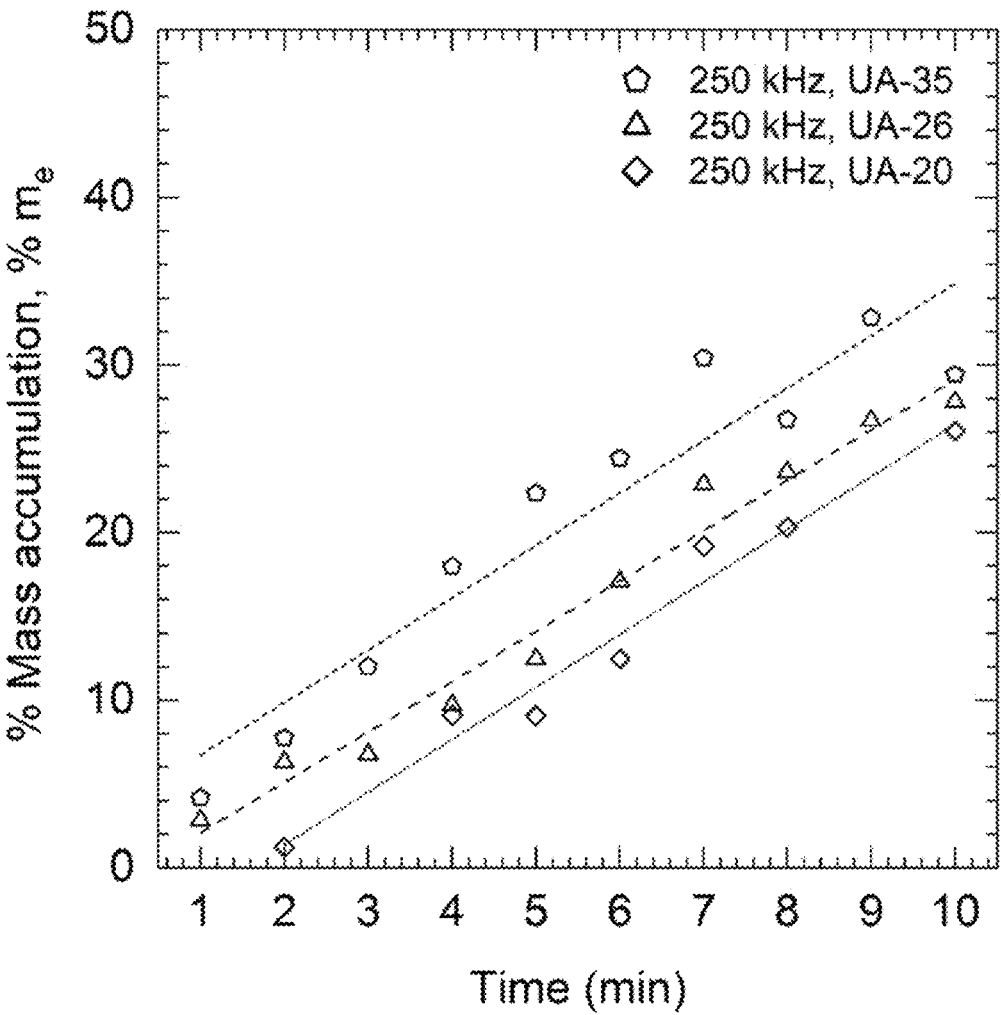
FIGS. 10A-B respectively show graphical representations of variation in mass accumulation percentage given changes voltage application duration for a particular ceramic powder at various mix ratios and at various frequencies given a particular mix ratio.
Figure 10B:
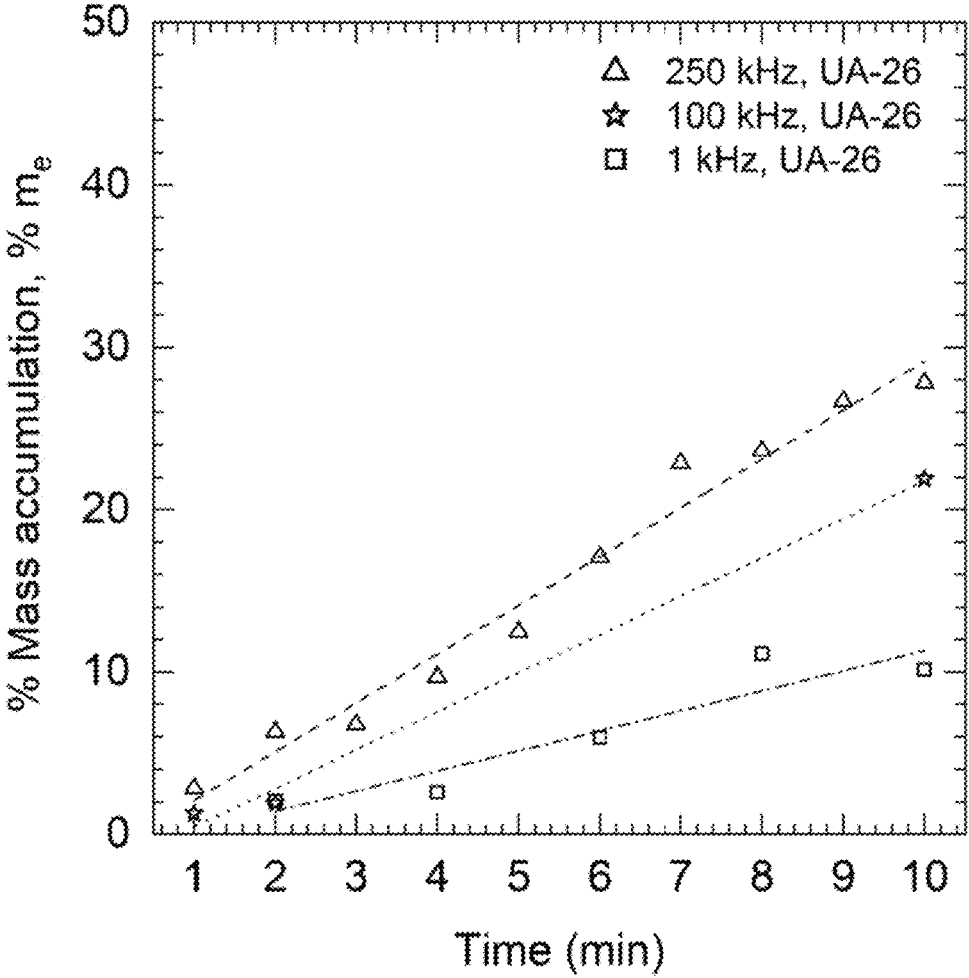

Initial studies for aqueous $Al_2O_3$ suspensions revealed that after the application of alternating voltage to the electrodes, ceramic suspensions became concentrated near one of the electrodes and suspension in the form of viscous paste was also stuck to that electrode. The observations suggested increased concentration of ceramic particles near the electrode, as well as accumulation of particles on the electrode. For frequencies below 50 kHz and above 1000 kHz, particles accumulated on S electrode. Whereas between 50 kHz and 1000 kHz, particles accumulated on R electrode. It is to note that before the application of field, removal of electrodes from the mold filled with suspension did not show any accumulation of particles on electrode surface. Optical images of the electrodes removed from the mold after the exemplary applications with $Al_2O_3$ suspensions at 1 kHz and 1000 kHz (field duration 10 min) are shown in FIGS. 10A and 10B, respectively. At both frequencies, top/first and bottom/second electrodes were S and R, respectively. It is seen that $Al_2O_3$ accumulated on the top/first electrode (S) at 1 kHz (FIG. 10A) and on the bottom/second electrode (R) at 1000 kHz (FIG. 10B).

Figure 6A:
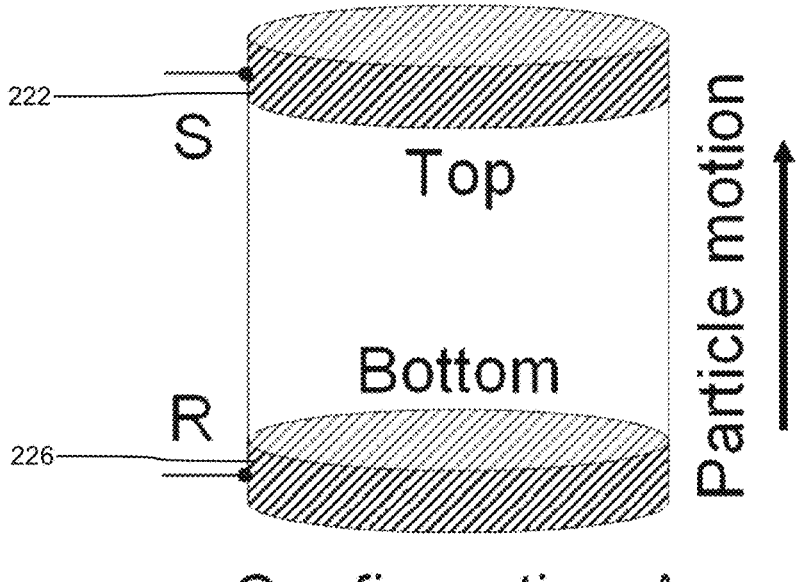
FIG. 6A illustrates an exemplary side schematic view of a first electrode polarity arrangement being illustrative of various aspects of the present disclosure.
Figure 6B:
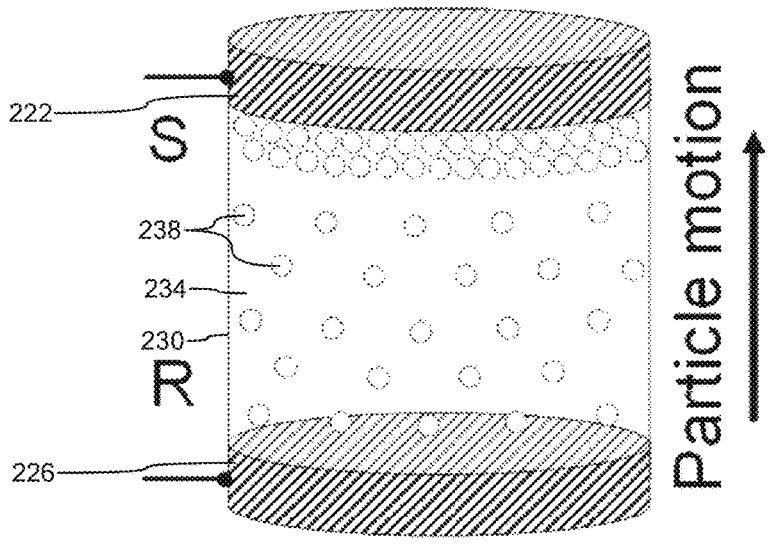
FIG. 6B illustrates motion of ceramic particles within the exemplary side schematic view of the first electrode polarity arrangement of FIG. 6A at a first voltage frequency being illustrative of various aspects of the present disclosure.
Figure 6C:
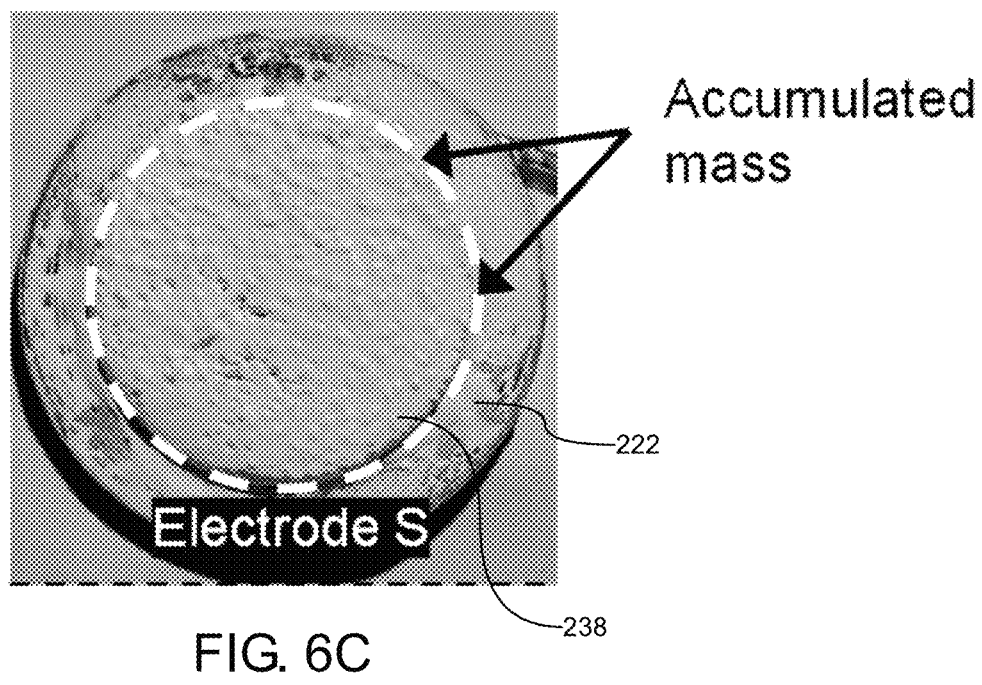
FIG. 6C illustrates a bottom view of a top electrode having ceramic powder particles dried thereon in accordance with the first electrode polarity arrangement of FIG. 6A at the first voltage frequency being illustrative of various aspects of the present disclosure.
Figure 6D:
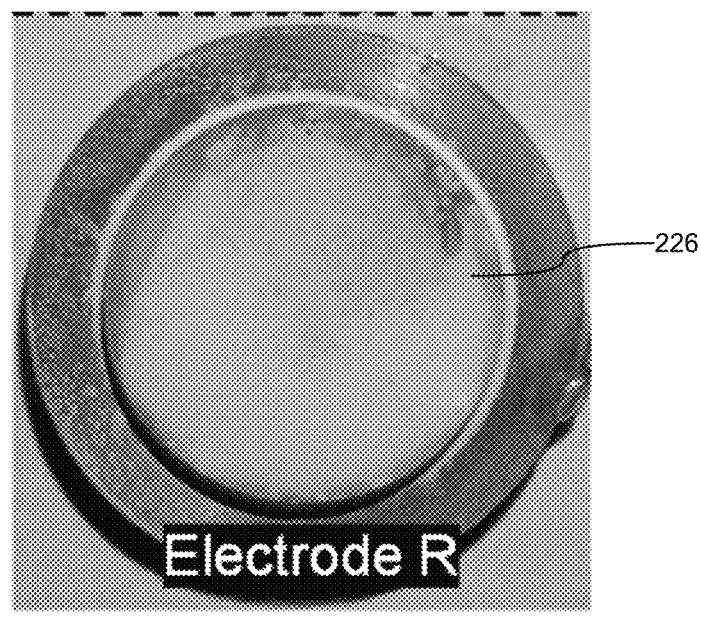
FIG. 6D illustrates a top view of an alternative or opposing electrode in accordance with the first electrode polarity arrangement of FIG. 6A at the first voltage frequency being illustrative of various aspects of the present disclosure.
Figure 6E:
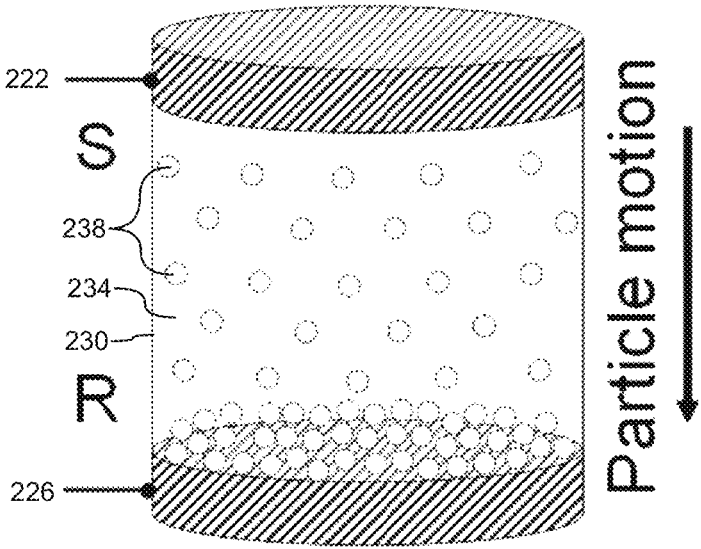
FIG. 6E illustrates motion of ceramic particles within the exemplary side schematic view of the first electrode polarity arrangement of FIG. 6A at an alternative or second voltage frequency being illustrative of various aspects of the present disclosure.
Figure 6F:
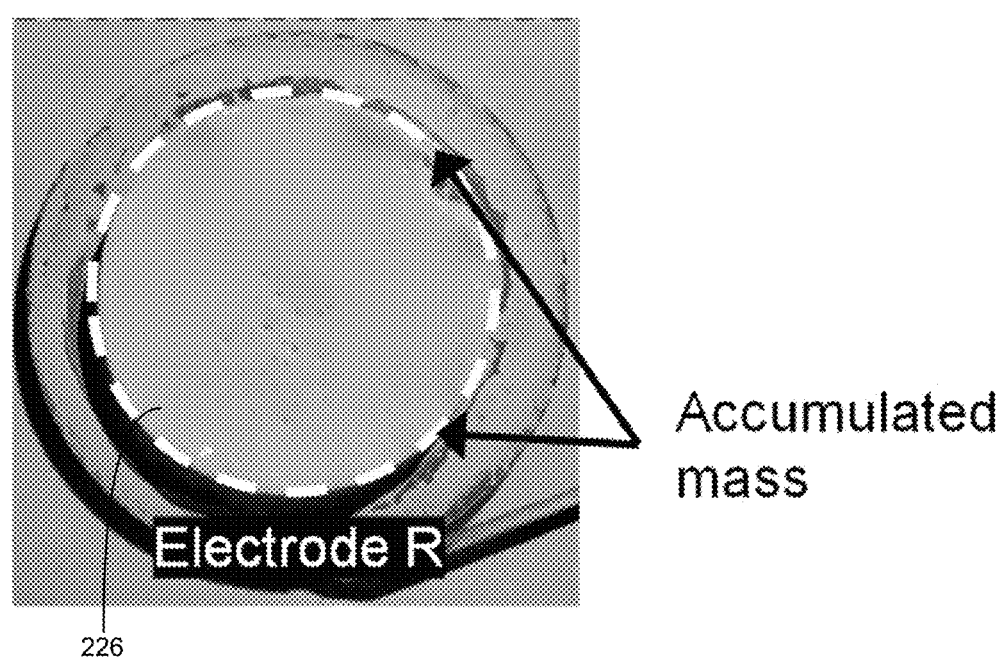
FIG. 6F illustrates a bottom view of a top electrode having ceramic powder particles dried thereon in accordance with the first electrode polarity arrangement of FIG. 6A at the alternative or second voltage frequency being illustrative of various aspects of the present disclosure.
Figure 6G:
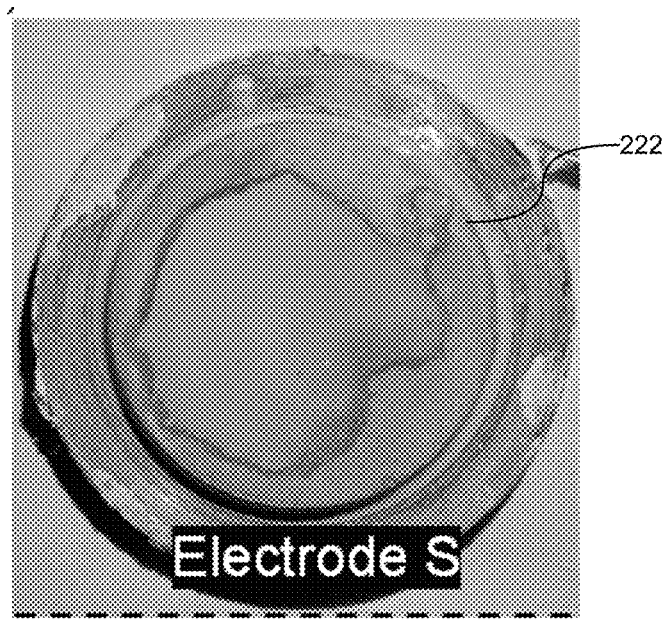
FIG. 6G illustrates a top view of an alternative or opposing electrode in accordance with the first electrode polarity arrangement of FIG. 6A at the alternative or second voltage frequency being illustrative of various aspects of the present disclosure.
Figure 7:
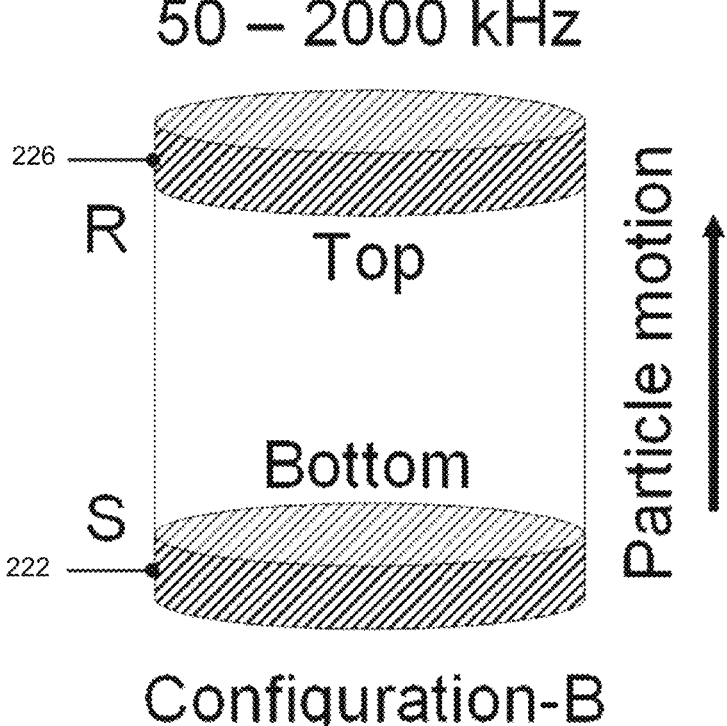
FIG. 7 illustrates an exemplary side schematic view of a second electrode polarity arrangement being illustrative of various potential aspects of the present disclosure.

It was then recognized that the quantity of particles that accumulate on an electrode could be affected by whether particle motion is in the direction of gravity or opposite to that of gravity, and that such particle motion was affected by frequency of voltage applied and electrode configuration. For example, for frequencies below 50 kHz and above 1000 kHz, top/first and bottom/second electrodes were S and R, respectively (Configuration-A, FIG. 6A). Whereas, between 50 kHz and 1000 kHz, top/first and bottom/second electrodes were R and S, respectively (Configuration-B, FIG. 7).

Figure 8A:
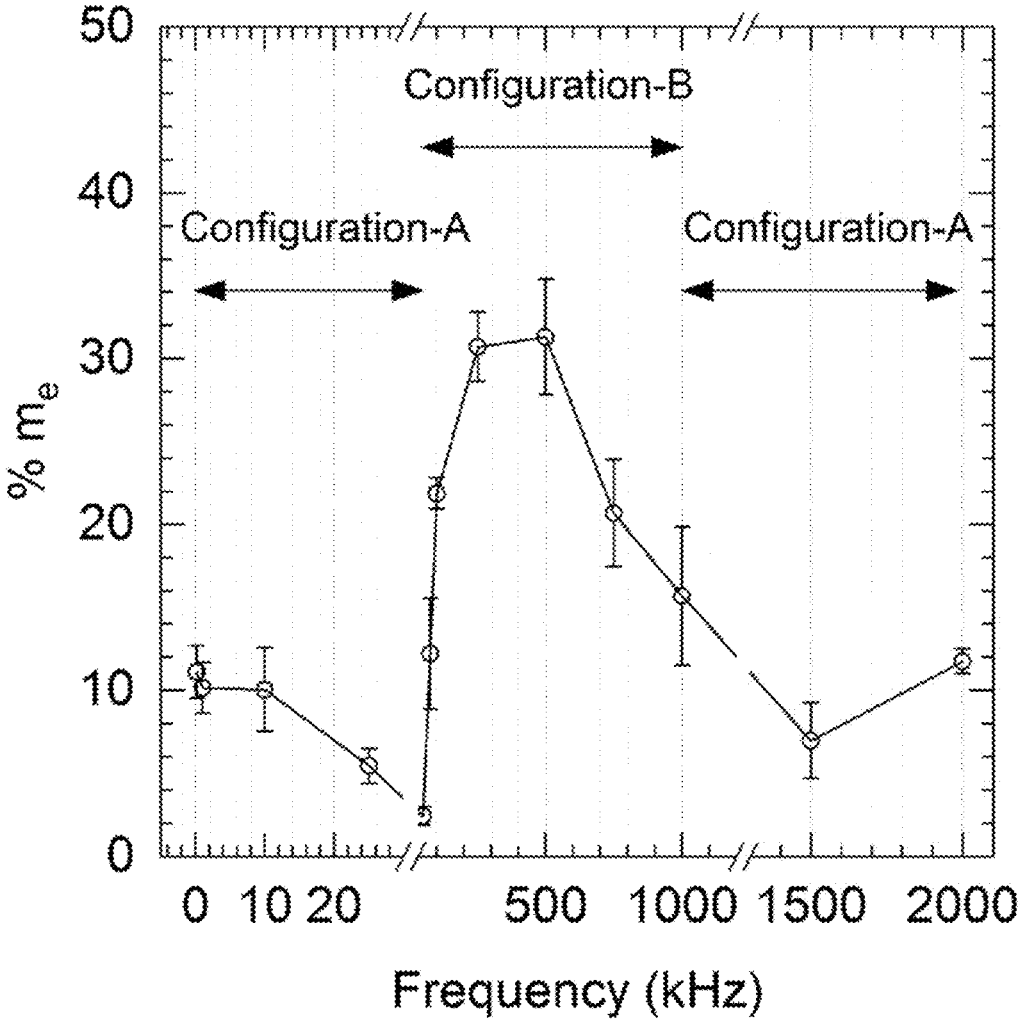
FIGS. 8A-B respectively show graphical representations of the variation in the average of % mass of accumulated ceramic particles (% m$_e$) on an accumulating electrode surface and temperature rise ($\Delta T$) in electrode.
Figure 8B:
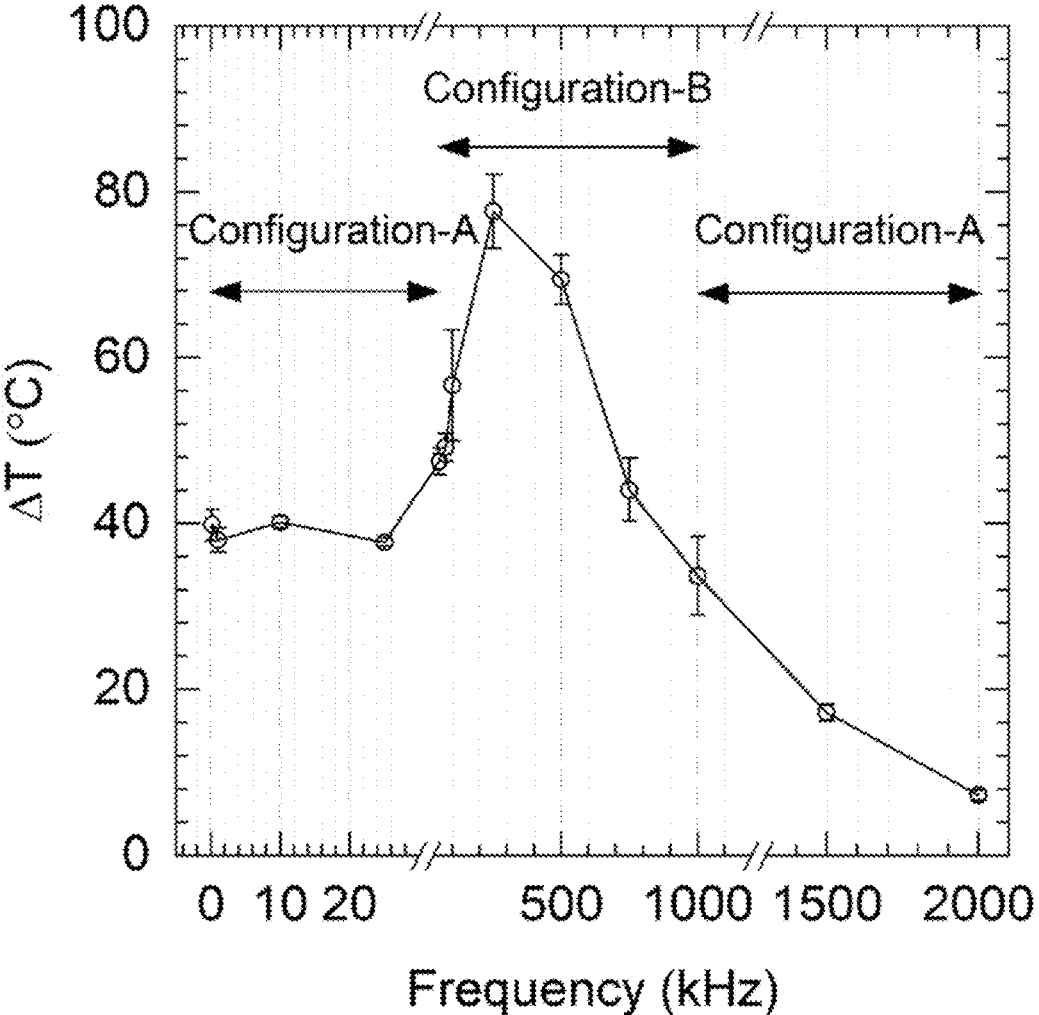

FIGS. 8A-B are graphical representations which show the variation in the average of % mass of accumulated ceramic particles (% $m_e$) on electrode surface and temperature rise ($\Delta T$) in electrode, respectively, for UA-26 suspension. % $m_e$ was estimated by dividing $m_e$ (mass accumulation on electrode) with ceramic mass in suspension in the mold. In the frequency range of 0.1-1000 kHz, applied Vpp was 190 V. Whereas for frequencies of 1500 kHz and 2000 kHz, Vpp was 130 V and 100 V, respectively. voltage was applied for 10 min. Configuration-A was used for all the frequencies <50 kHz and >1000 kHz. Whereas for frequencies in the range of 50-1000 kHz, Configuration-B was used. $\Delta T$ corresponds to temperature rise on R electrode after field duration of 10 min.

Between 0.1 and 10 kHz, average % $m_e$ (10%) was unaffected by the frequency variation. As the frequency increased to 25 kHz and then to 50 kHz, there was a considerable drop in % me. Among all the frequencies, % $m_e$ is minimum at 50 kHz. Interestingly, with a further increase in frequency, % $m_e$ increased sharply and reached maximum in the range of 250-500 kHz with average % $m_e$ slightly above 30%. However, with the further increase in frequency, % $m_e$ sharply decreased. Average values of % $m_e$ at higher frequencies (>1000 kHz) are comparable to that in the lower frequency range (<50 kHz). FIGS. 8A-B suggest that % $m_e$ is a strong function of frequency.

Similar to % $m_e$, UA-26 suspensions also exhibited a similar behavior in the variation of $\Delta T$ (FIG. 8B). More interestingly, the frequency dependence of $\Delta T$ is observed to be similar to the frequency dependence of $m_e$. Therefore, $\Delta T$ also reached maximum at the frequencies where maximum accumulation of ceramic particles on electrode occurred. For both suspensions, the maximum and minimum $\Delta T$ values are observed to be in the ranges of 70-80° C. and 30-40° C., respectively. Temperature increase in electrode was considered as temperature rise in ceramic suspension.

Figure 9:
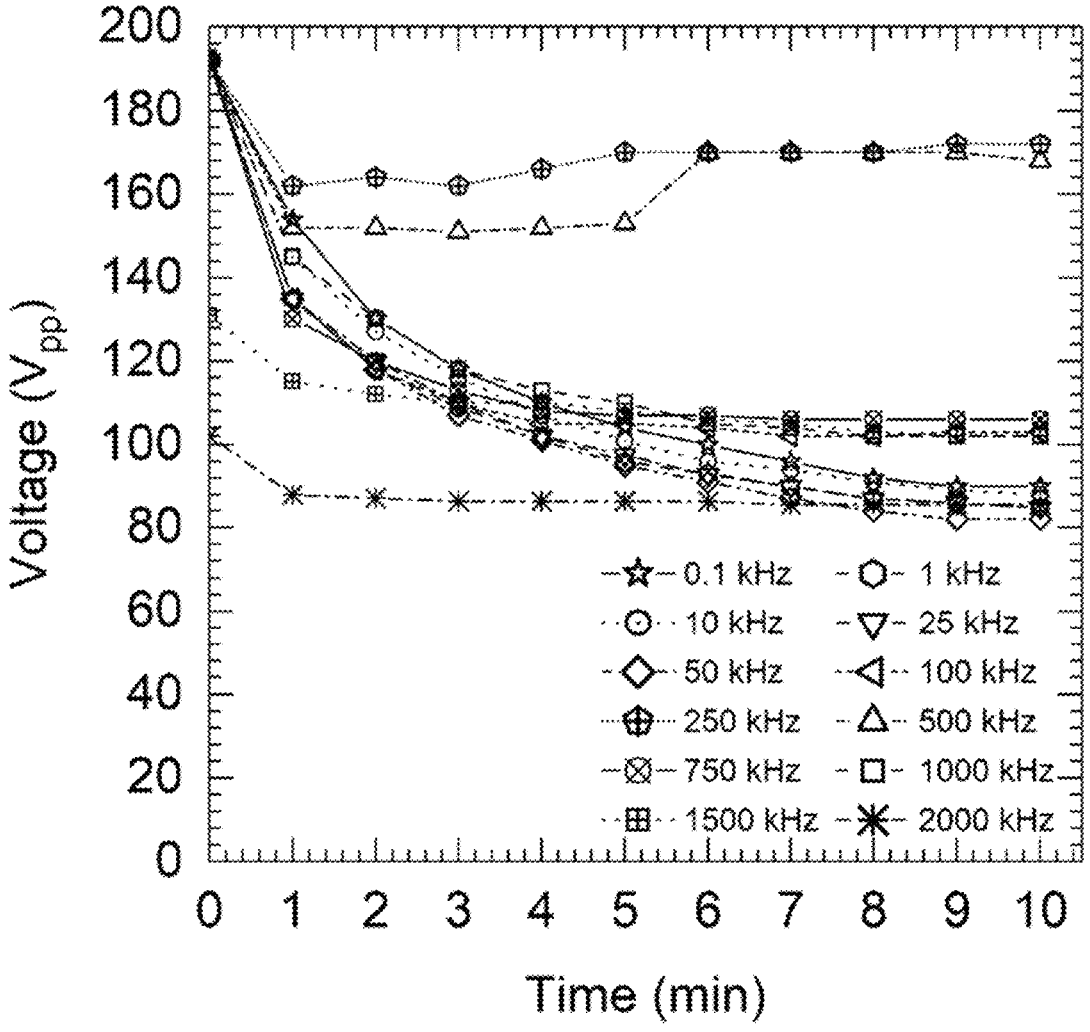
FIG. 9 shows a graphical representation of the variation in Vpp with time at different frequencies as the ultrafine particles within a particular suspension aggregated on the electrode for various application frequencies.

During the application of alternating voltage to the electrodes, the change in peak-to-peak voltage ($V_{pp}$) across ceramic suspension was also measured, which revealed a considerable decrease in voltage with time at most of the frequencies. Note that when an alternating voltage to the electrodes was applied to only DI water, voltage remained constant with time. FIG. 9 shows the variation in $V_{pp}$ with time at different frequencies for UA-26 suspensions.

FIG. 10A shows the variation in % $m_e$ with voltage duration for aqueous $Al_2O_3$ suspensions of 20, 26 and 35 vol. % solid loadings at 250 kHz. Since UA-26 exhibited significant accumulation of particles at 250 kHz, this frequency was selected to study the effect of solid loading of suspension. For each composition, % $m_e$ increased almost linearly with time and reached about 30%, suggesting that field duration has a strong influence on the accumulation of ceramic particles on electrode surface. These results also indicate a moderate influence of solid loading on % me, which increased with the ceramic content in suspension. Note that for UA-35 suspension, almost the same level of % $m_e$ was achieved by 6 min compared 10 min for the other compositions. FIG. 10B shows the variation in % $m_e$ with field duration at 1, 100 and 250 kHz for UA-26 suspension. These results also show a significant influence of field duration on % me. Additionally, % $m_e$ increased consistently with frequency.

Figure 11A:
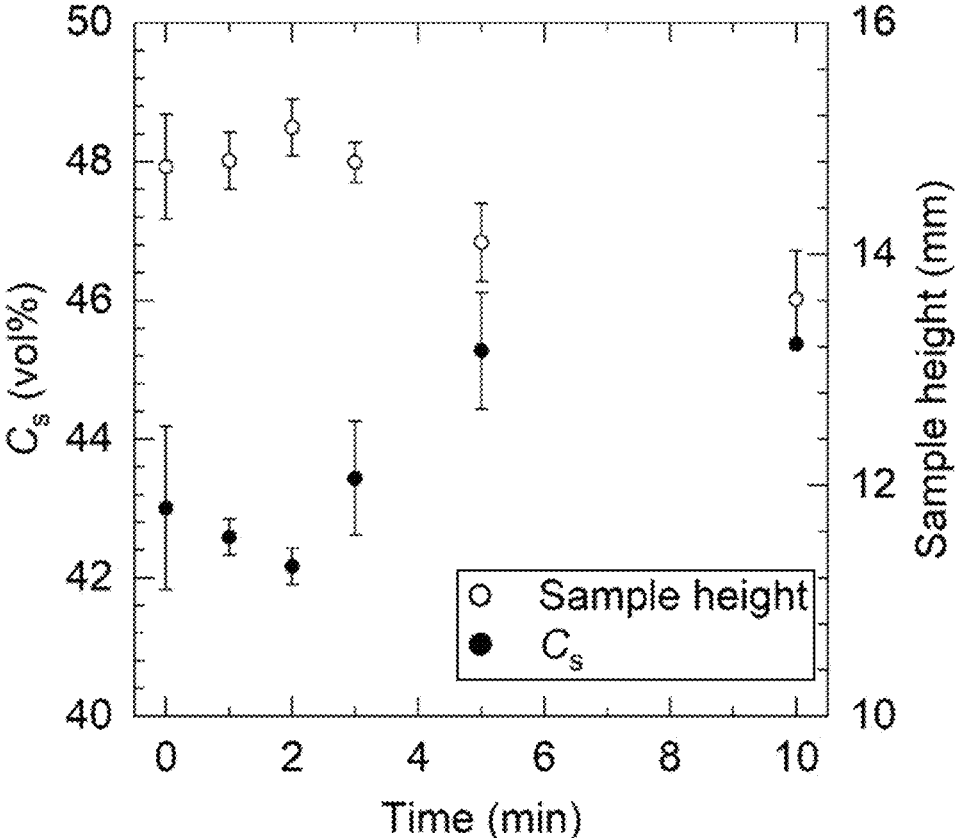
FIG. 11A shows a graphical representation of variation in ceramic vol % (Cs) in sintered porous ceramic samples and sample height as a function of total voltage application times.
Figure 11B:
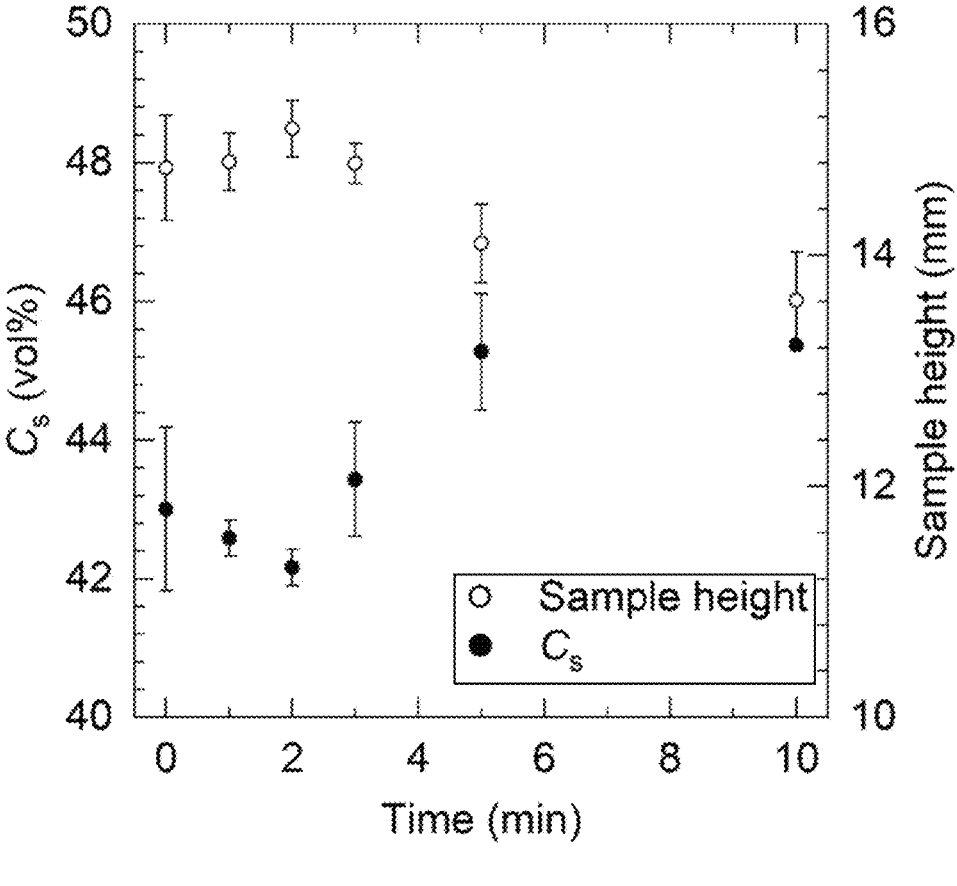
FIG. 11B respectively show graphical representations illustrating variation in Cs along sample height as a function of total voltage application times.

Porosity was determined both from ice-templated sintered cylinders and from thin disks (1 mm thickness) extracted from sintered cylinders. These samples were fabricated from UA-26 suspensions. Porosity measured from these thin disks allows to evaluate the effect of voltage on the variation of porosity along the sample height, which is also the growth direction of ice crystals. FIG. 11A shows the variation of ceramic vol % ($C_s=\rho_r\times100$) in sintered $Al_2O_3$ samples with voltage duration. $\rho_r$ is relative density. Samples fabricated with field exhibited only a slight increase in $C_s$, with a noticeable difference at longer field duration. With the increasing field duration, sample height decreased slightly, but sample diameter was unchanged (not shown). FIG. 11B shows the variation in $C_s$ along the sample height, i.e., growth direction, for different field duration, estimated from 1 mm thin disks. Expectedly, $C_s$ is almost constant along the height in control samples. With the field application and increasing field duration, $C_s$ in the bottommost disk increased markedly. $C_s$ in the bottommost disk without the field is ~40 vol % but increased even at 2 minutes. At 3 minutes, $C_s$ increased to 60 vol % and reached over 80 vol % at 10 minutes. The increase of $C_s$ in the bottommost disk is directly related to the enhanced concentration of particles with field duration in the suspension in the vicinity of the bottom electrode, whereas concentration change was negligible in the rest of the suspension. Local ceramic concentration ($C_l$) in the bottommost region of the suspension in the mold was approximately estimated. Since the bottommost disk, diameter 15 mm and thickness 1 mm, exhibited the maximum $C_s$, $C_l$ was estimated within this volume. FIG. 8c shows that up to 2 minutes, change in $C_l$ was relatively negligible. At 3 minutes, $C_l$ increased to about 36 vol % and to 48 vol % at 10 minutes. Therefore, these calculations revealed how much $C_1$ increased due to the alternating field relative to bulk suspension concentration (26 vol %).

Figure 12:
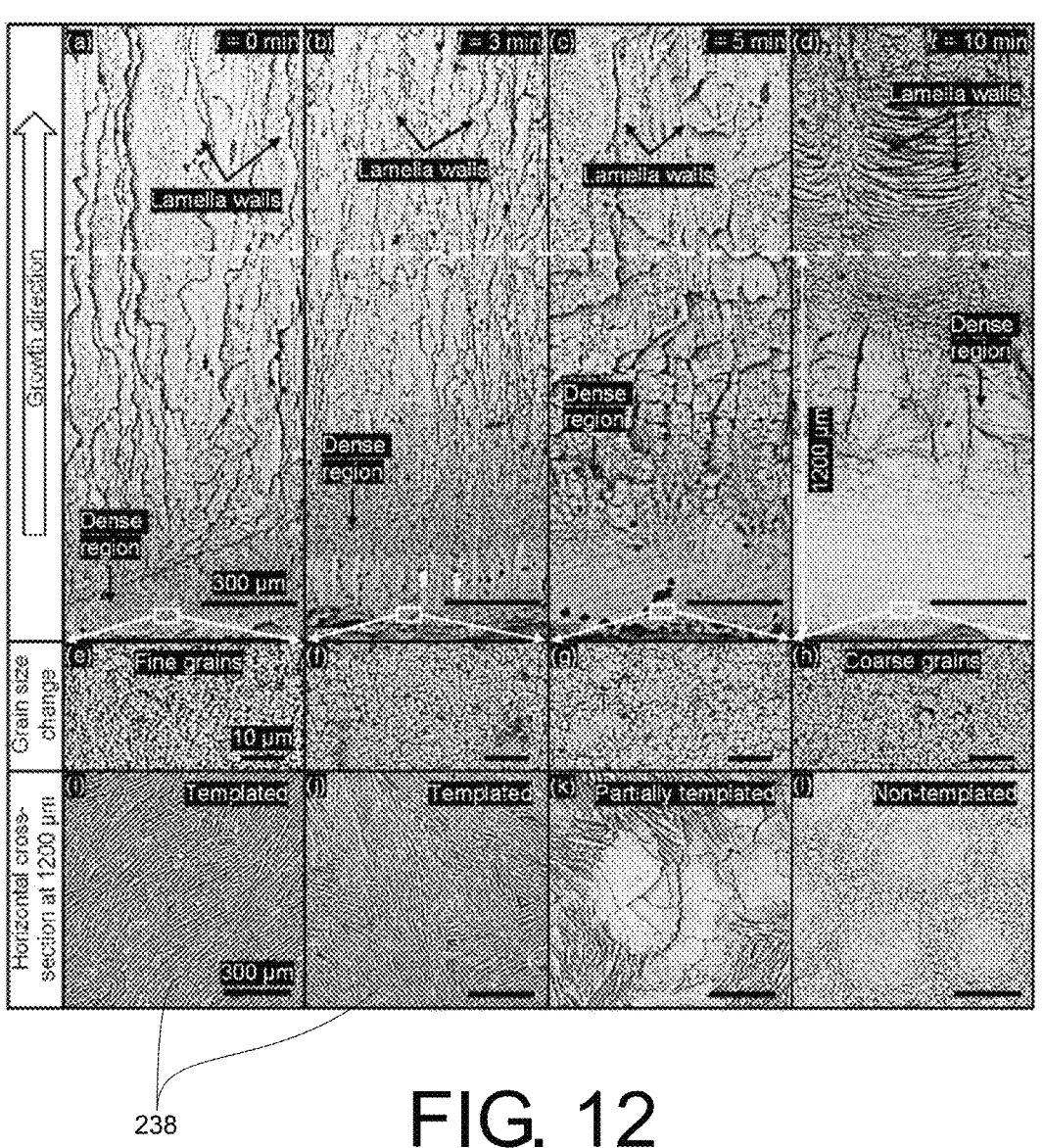
FIG. 12 illustrates various scanning electron microscope images of cross sections of various exemplary accumulated ceramic particles illustrating the difference between aggregations utilizing various ice-templating techniques, partially ice-templated, and non-ice-templated particle aggregations.

2.5 Microstructure of Ice-Templated Sintered Materials without and with Field and Uniaxial Compressive Strength FIG. 12, in sections (a)-(l), shows SEM images of vertical cross-section, up to 1900 μm from bottom, of sintered samples fabricated without and with the field. The microstructural observations made from each sintered sample are representative for the corresponding fabrication conditions. At the beginning of freezing, ice crystals grow rapidly and engulf particles. As a result, a dense, thin non-templated region develops at the bottom of sintered materials, which can be seen in the material fabricated without field, as seen in FIG. 12 in section (a). However, the thickness of the non-templated layer increased with field duration, with a marked increase at 10 minutes, attributed to field-induced increased concentration of particles in the bottom region. Higher magnification SEM images of bottom regions, as seen in FIG. 12 sections (e)-(h), revealed that grain size increased with field duration, supporting increased particle concentration and particle packing in green samples, facilitating mass transfer during sintering and grain growth. FIG. 12 in sections (i)-(l) shows SEM images of a plane perpendicular to the growth direction and at the height of 1200 μm from the bottom. Without field and at 3 minutes, completely tem plated microstructure developed by this height. However, at the same height, the microstructure was partially templated at 5 minutes but non-templated at 10 minutes. Thus, FIG. 12 illustrates a strong influence of voltage on microstructure development at the beginning phases of ice-templating, suggesting that the increased concentration of $Al_2O_3$ particles near the bottom electrode delayed the transition from non-templated to templated microstructure. In FIG. 12, in sections (a)-(c), lamella walls are aligned along the growth direction in the templated region. At 10 minutes, as illustrated in FIG. 12, section (d), lamella walls are almost perpendicular to the growth direction.

Figure 13:
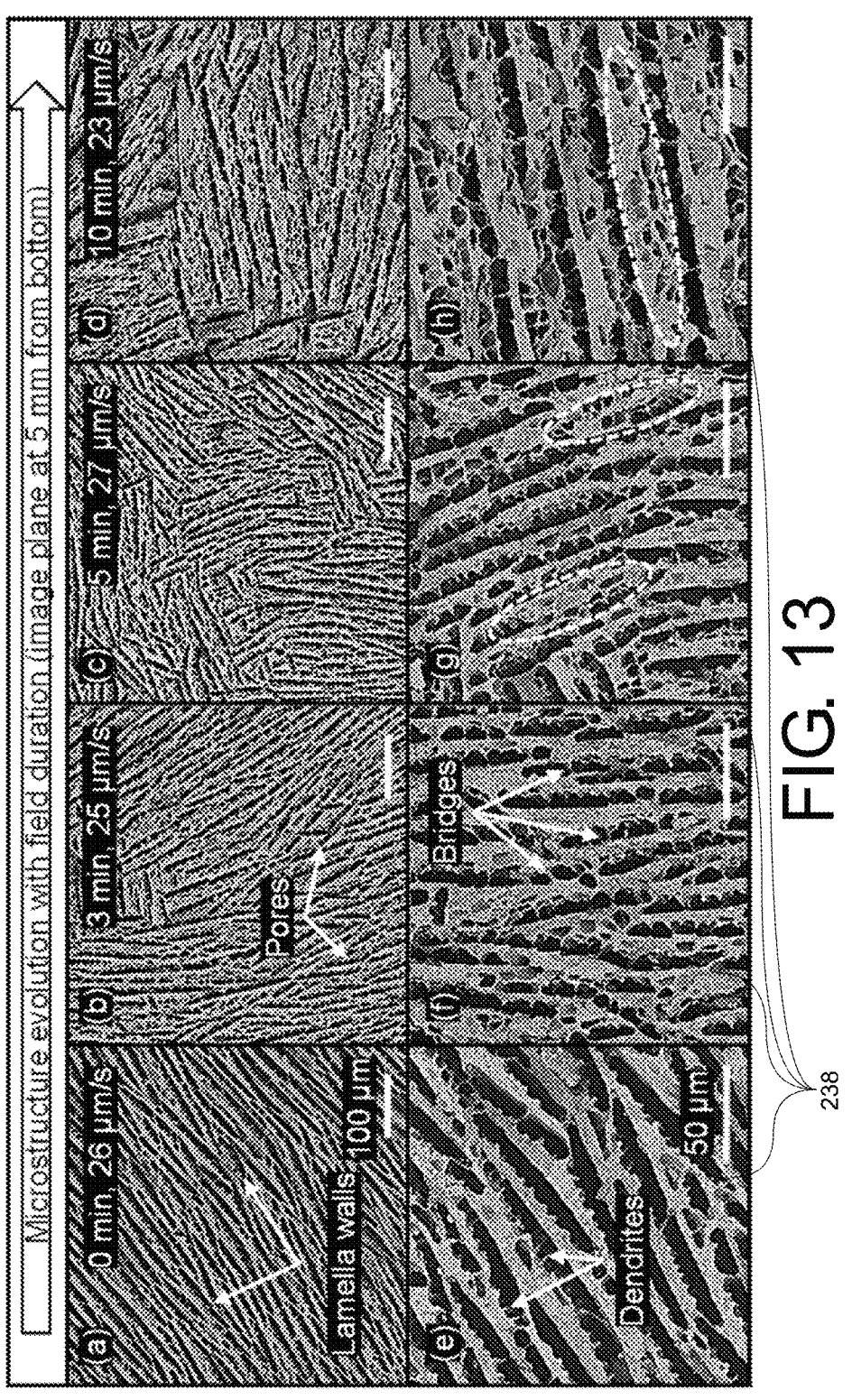
FIG. 13 illustrates various scanning electron microscope images showing a top view at a cross section perpendicular to a growth direction at a particular height which illustrate microstructure evolution of the ceramic particles accumulated on the electrode given various voltage alternation frequencies.

FIG. 13 in sections (a)-(h), show SEM images of a plane perpendicular to the growth direction and at the height of 5 mm from the bottom of sintered samples. Higher magnification SEM images in FIGS. 15-18 provide further insights into microstructure developments. The characteristic ice-templated microstructure is observed for all the fabrication conditions but turned increasingly finer with field duration. As shown in FIG. 13, in section (a), without the field, morphology is lamellar with lamella wall thickness ($\delta$) 8.5±2.4 μm and lamellar bridge density ($\rho_b$) 272.6±23.6 mm$^{-2}$. $\rho_b$ is defined as the number of bridges present in between the adjacent lamellae walls per unit area. As shown in FIG. 13, in section (b), application of voltage for 3 minutes, $\delta$ decreased to 7.3±2.5 μm, and $\rho_b$ increased significantly to 822.5±113.4 mm$^{-2}$, resulting in dendritic morphology. At 5 minutes, as seen in FIG. 13, sections (c) and (g), morphology appears more dendritic with $\delta$=7.3±3.1 μm and $\rho_b$=836.3±80.3 mm$^{-2}$. In addition to long pore channels between the lamella walls (the characteristic ice-templated microstructure), there are regions with the walls containing small pores. By 10 minutes, as seen in sections (d) and (h), the fraction of small pores within the walls increased markedly. FIG. 13, in sections (a)-(h) thus suggests that the primary effect of the voltage was in enhancing connectivity between lamella walls and turning the morphology dendritic. However, prolonging voltage duration to 10 minutes had additional effects on microstructure, which may not be desirable.

Figure 14:
FIG. 14 illustrates various scanning electron microscope images showing a side view at a cross section parallel to a growth direction within 1 mm of height at various voltage alternation frequencies which illustrate microstructure evolution of the ceramic particles accumulated on the electrode at said frequencies and exposure times.
Figures 15A, 15B:
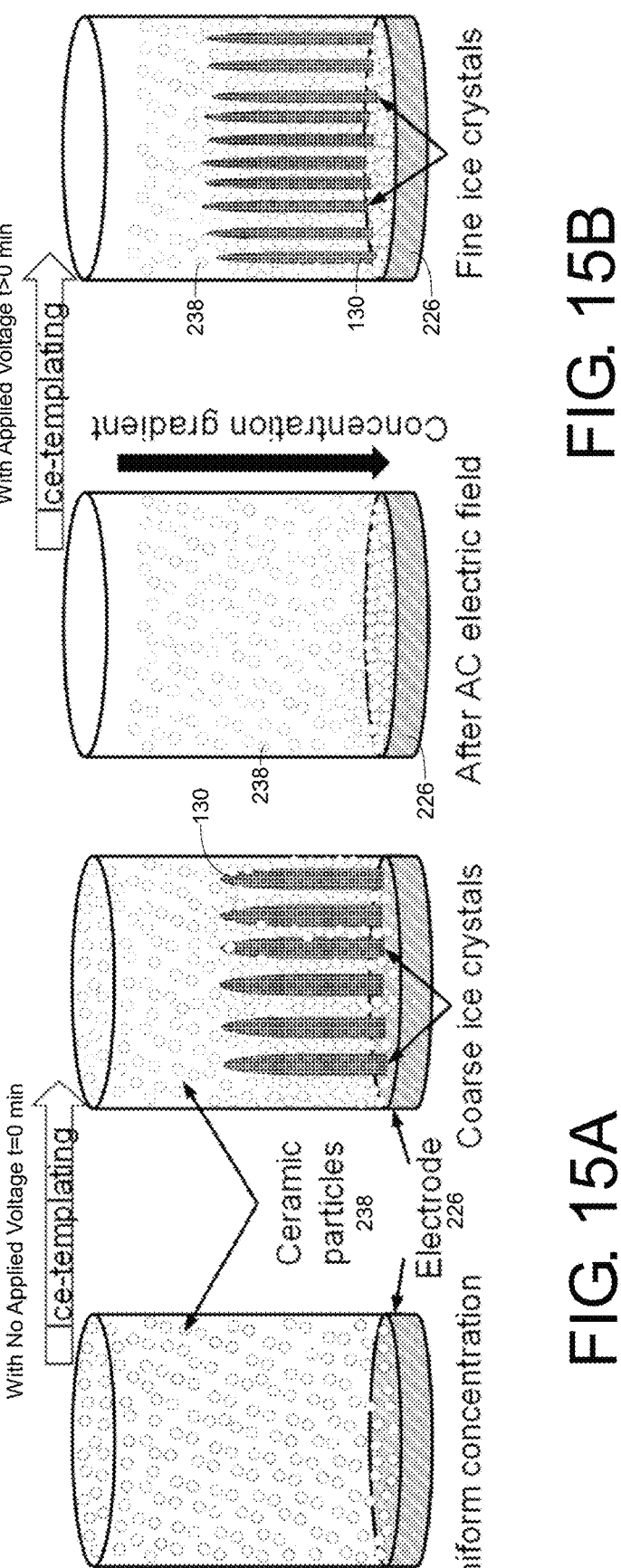
FIG. 15A illustrates an exemplary side perspective view of an ice templating technique illustrating ice crystal formation within a suspension fluid without application of alternating voltage.
FIG. 15B illustrates an exemplary side perspective view of an ice templating technique illustrating ice crystal formation within a suspension fluid with application of alternating voltage.

Therefore, increased concentration of particles in suspension near the cold-finger where ice crystals first formed likely resulted in the development of finer ice crystals compared to that without the field. To shed light on this aspect, bottom regions of sintered samples fabricated without and with field (3 minutes) were further characterized using SEM. From the bottom of one representative sintered sample for each condition, materials were removed in small thickness (~200 μm) along the growth direction, and horizontal cross-sections were imaged. FIG. 14, sections (a)-(h) show SEM images at different heights for the material fabricated without, as shown in sections (i)-(l), and with field applied for 3 minutes (m-p). Without the field, at the height of 200 μm, the microstructure contains randomly oriented (cellular) pores and characteristic ice-templated microstructure developed by 400 μm. With field, the dense region is seen even at 400 μm, cellular pores evolved by 600 μm, and the characteristic tem plated microstructure is evident at 800 μm. From FIG. 12, sections (a)-(l), it is evident that, first, increased local concentration of particles in suspension due to voltage delayed the evolution of templated microstructure. Second, the increased concentration of particles resulted in the development of finer microstructure, indicating that finer ice crystals formed during the templating step, which can be controlled.

FIGS. 15-18 overall show the role of the voltage in microstructure development. At the comparable freezing conditions, with the increasing suspension concentration, the microstructure of ice-templated materials also becomes increasingly finer. FIG. 15A shows ice crystals formed in a ceramic suspension of uniform concentration (without applied voltage). FIG. 15B shows ice crystals developed in the same suspension where voltage was applied before freezing resulted in a concentration gradient with concentration higher in the vicinity of the bottom electrode (Cold-finger), increasing the number of sites for ice crystal nucleation. As a result, more ice crystals formed in the concentrated region, which continued to grow upward even in the region of lower concentration. Therefore, the voltage-assisted process can result in a finer ice-tem plated ceramic microstructure than if the same suspension is solidified without applying field before the freezing step. Microstructure tuning will depend on the local concentration of ceramic particles (controlled by the voltage) at the freezing end, where ice crystals nucleate during the templating process.

Figures 16A, 16B, 16C, 16D:
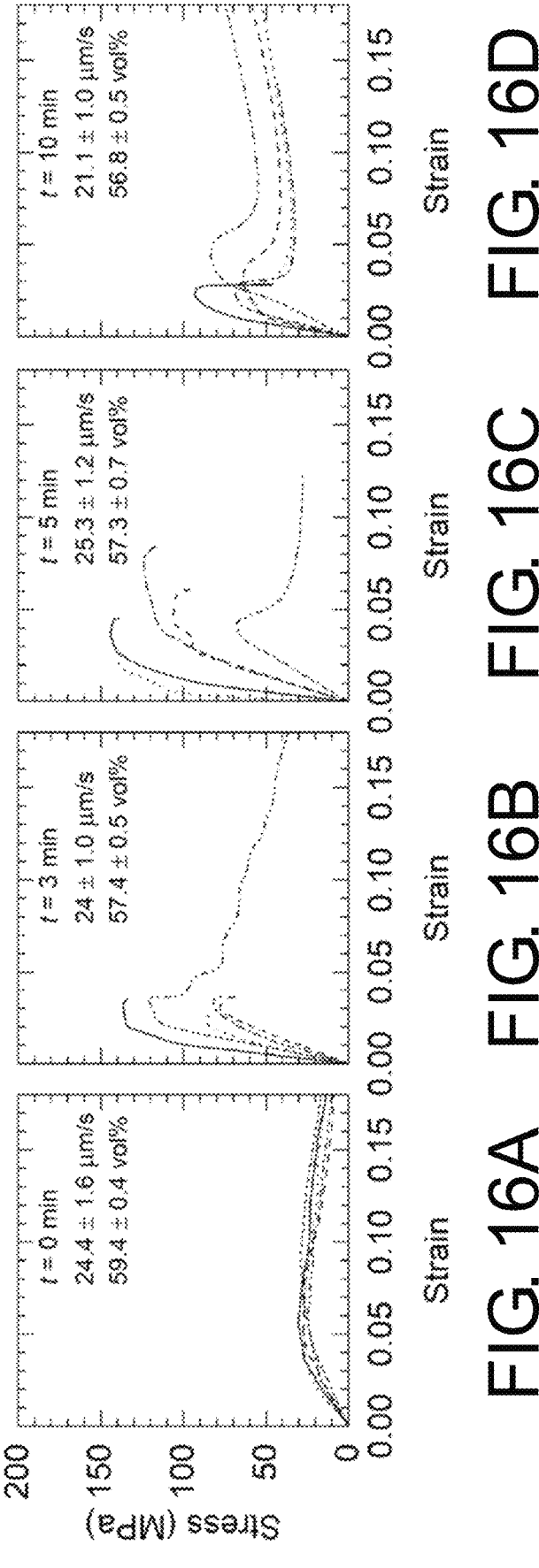
FIGS. 16A-D illustrate graphical representations of uniaxial compressive stress-strain curves of materials fabricated without alternating voltage applied in FIG. 16A and with alternating voltage applied for 3, 5 and 10 minutes respectively in FIGS. 16B-D
Figure 17:
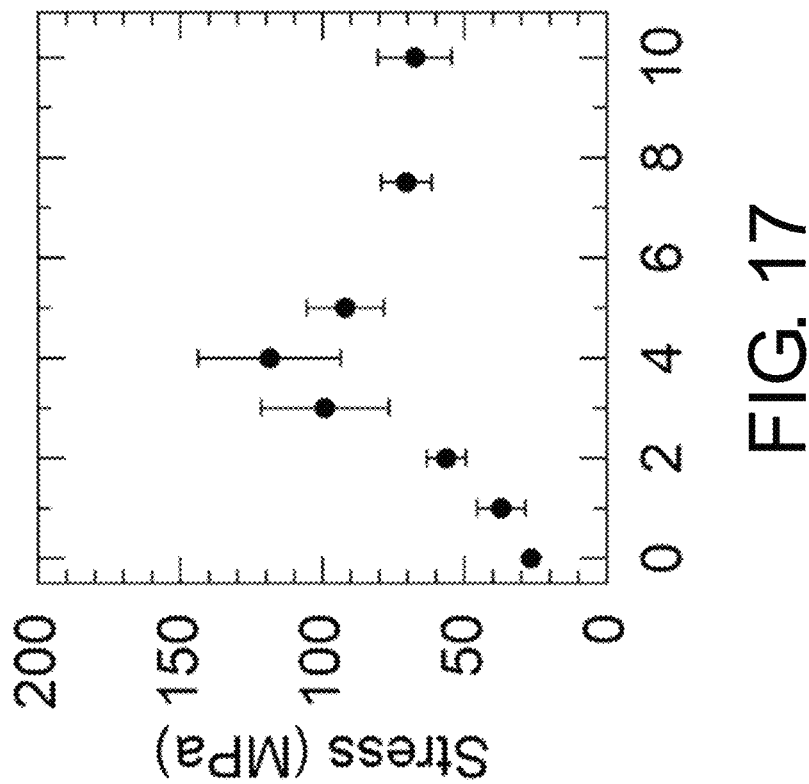
FIG. 17 illustrates a graphical representation of variation of maximum compressive strength of a final structure with respect to various voltage application time durations.
Figures 18A, 18B, 18C:
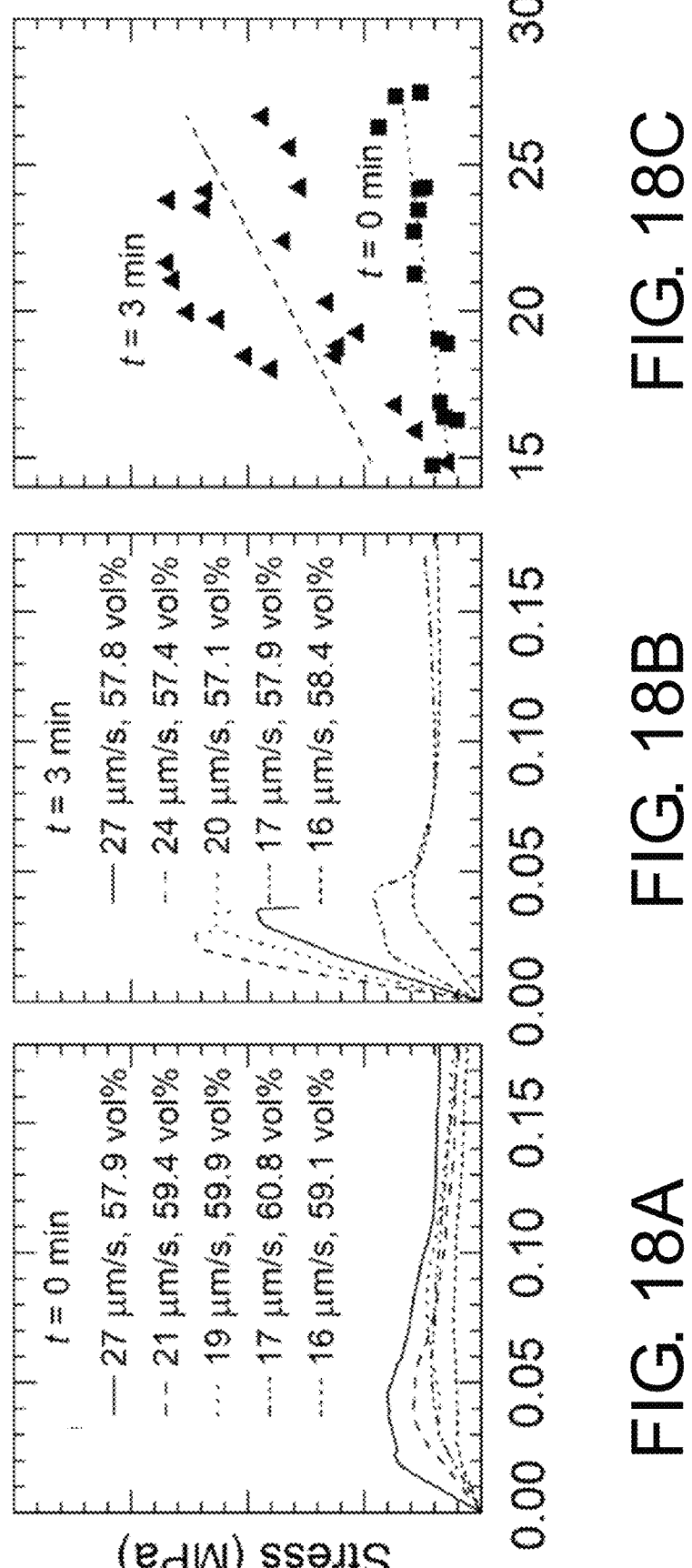
FIG. 18A-C illustrate a graphical representation of stress-strain curves at different freezing front velocity (FFV) for materials fabricated, with FIG. 18A being without an applied voltage, FIG. 18B being with a voltage application of a duration of 3 minutes, and FIG. 18C showing variation of compressive strength with FFV for 0 and 3 min.

FIGS. 16-18 then show the effects of voltage-assisted microstructure changes on the uniaxial compressive response (stress-strain curves), FIG. 16A showing a control sample (no field), and FIGS. 16B-D for field durations of 3, 5 and 10 minutes respectively. Average freezing front velocities (FFVs) for the materials are indicated in FIGS. 18A-C, which illustrates stress-strain curves at different freezing front velocity (FFV) for materials fabricated without voltage applied, as shown in control in FIG. 18A, wherein FIG. 18B shows these curves in materials fabricated with voltage applied for a duration of minutes, and where FIG. 18C illustrates graphical variation of compressive strength with FFV for 0 and 3 min. Porosity values of all the sintered disks tested in compression were comparable. Compared to control samples, field-assisted materials exhibited remarkably enhanced strength. The trend is more clearly visible in FIG. 18C, showing the variation of maximum compressive strength ($\sigma_m$) with field duration. For control samples, $\sigma_m$ is only 26.6±1.5 MPa. With the increasing field duration, the average $\sigma_m$ almost linearly increased to 118.7±25.1 MPa at 4 minutes. Between 3 and 5 minutes, materials exhibited remarkably higher $\sigma_m$ (3- to 4-fold) than control samples. Beyond 5 minutes, materials exhibited a decrease of $\sigma_m$; however, they still maintained significantly higher strength (67.4±13.0 MPa at 10 minutes) than control samples. Although the suspensions for different t were ice-templated at the same gap between the Cold-finger and liquid $N_2$, FFV values decreased with field duration, mainly between 5 (25.3±1.2 μm/s) and 10 minutes (21.1±1.0 μm/s). With the decreasing FFV, the ice-templated ceramic microstructure becomes lamellar, and compressive strength decreases. However, here, the strength decrease could be related to a gradual loss of characteristic ice-templated microstructure at higher field durations, as discussed before. Control samples showed only a moderate increase of $\sigma_m$ with FFV, whereas 3 minutes materials exhibited a marked increase with the strength gap increased with FFV.

The application of alternating voltage to the electrodes to aqueous ceramic suspension generated DC field, resulting in a local increase of suspension concentration and accumulation of ceramic particles on a metal electrode, which can be controlled. The findings were used to develop a novel methodology, where a voltage was first applied to ceramic suspensions, followed by ice-templating. The results revealed that the changes in the local concentration of ceramic particles in the vicinity of the Cold-finger could be used for the controlled microstructure manipulation and remarkable improvement of compressive mechanical properties without changing porosity. The results also suggest that the local change of concentration relative to bulk suspension composition was critical in achieving the maximum strength. Importantly ceramic particles responded to the voltage without the need for a second phase material. The current results could not be achieved by directly applying DC voltage to the electrodes to ceramic suspensions, and the preliminary findings suggested a difference in the deposited ceramic layers between the fields. Thus, the current implementation of the exemplary embodiment revealed the significant potential of alternating voltage to the electrodes to fabricate ice-templated materials. Accordingly, the embodiments discussed herein will significantly contribute to advancing ice-templated materials development using externally energized fields.

The currently employed exemplary apparatus is illustrated being arranged with the second electrode being located at a bottom portion of the suspension solution. However, various orientations and additional electrodes can be provided in any combination of orientations with regard to the suspension solution. In this way, the suspended particles can be drawn toward the one or more electrodes so as to create any desired ceramic density profile. It will then be appreciated that the provision of additional electrodes and operating the electrodes at various frequencies at various orientations can allow for a significant increase in the complexity of the density profile or relative strength and desired increase or decrease of pore size at various locations of the final sintered porous ceramic structure.

It is noted that, unless specified otherwise, no specific order is required in the aforementioned methods, though generally these method steps can be carried out sequentially. Although application of the alternating voltage to the given electrodes about the suspension fluid ought to be performed at least at some time while the suspension fluid is in a liquid state. Then depending on the speed of freezing and the desired characteristics of the ice crystals resulting from freezing the fluid at different rates it will be appreciated that application of the alternating voltage can be adjusted so as to achieve a desired effect.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but nevertheless are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

We claim:

1. A method of forming variable density ceramic structures, the method comprising: obtaining a ceramic powder having an ultrafine a particle size being less than 5 µm; mixing the ceramic powder into a suspension fluid thus forming a ceramic suspension; providing a mold configured to retain the ceramic suspension; providing a plurality of electrodes about the mold; applying an alternating voltage to the plurality electrodes thus forming alternating electric currents through the suspension thus causing accumulation of ceramic particles on at least one of the electrodes wherein the applying of alternating voltage to the plurality electrodes is performed at 100-190 volts and wherein the alternating voltage is applied at 0.1-2000 kHz; reducing the temperature of the ceramic suspension thus inducing the formation of ice crystals therein; freezing the ceramics suspension until the suspension fluid is completely frozen; drying the frozen suspension so as to remove the suspension fluid and leaving the ceramic powder, the ceramic powder being retained in a porous accumulated state; and sintering the ceramic particles into a solid architecture retaining a common final structure with the ceramic particles in the porous accumulated state.

2. The method of forming variable density ceramic structures of claim 1, wherein:

the particle size of the ceramic powder is approximately 1 μm.

3. The method of forming variable density ceramic structures of claim 1, wherein:

the suspension fluid is deionized water.

4. The method of forming variable density ceramic structures of claim 3, further comprising:

providing a milling material to the suspension;

performing a mixing cycle; and removing the milling material from the suspension.

5. The method of forming variable density ceramic structures of claim 4, wherein: the milling material is provided as 5 mm spheres of zirconia.

6. The method of forming variable density ceramic structures of claim 1, wherein: one of the electrodes is configured to act as a Cold-finger.

7. The method of forming variable density ceramic structures of claim 6, further comprising:

reducing the temperature of the Cold-finger below the freezing point of the suspension fluid.

8. The method of forming variable density ceramic structures of claim 6, further comprising the steps of:

exposing the Cold-finger to liquid nitrogen; and varying the size of the ice crystals and a freezing rate of the suspension fluid by varying a distance between the Cold-finger and the liquid nitrogen.

9. The method of forming variable density ceramic structures of claim 6, wherein:

during the step of reducing the temperature of the suspension a ΔT defined as the difference in temperature between the Cold-finger and an opposing electrode is maintained between 30° C. and 80° C.

10. The method of forming variable density ceramic structures of claim 1, wherein:

the drying is performed via exposure of the suspension fluid to sublimation conditions so as to remove the suspension fluid via sublimation.

11. The method of forming variable density ceramic structures of claim 1, wherein:

the drying is performed via placement into an oven at sub-sintering temperatures so as to remove the suspension fluid crystals via evaporation.

12. The method of forming variable density ceramic structures of claim 1, wherein:

the mold is provided being formed of PTFE Fluoropolymer.

13. The method of forming variable density ceramic structures of claim 1, wherein:

the alternating voltages are applied for 3-10 minutes.

14. The method of forming variable density ceramic structures of claim 1, wherein:

the ceramic powder concentration in the suspension fluid being 20-35 vol. % solid loadings.

15. A method of forming variable density ceramic structures, the method comprising: obtaining a ceramic powder having an ultrafine particle size; mixing the ceramic powder into a suspension fluid thus forming a ceramic suspension, the ceramic powder concentration in the suspension fluid being 20-35 vol. % solid loadings; providing a mold configured to retain the ceramic suspension, the mold being provided as PTFE Fluoropolymer; providing a plurality of electrodes about the mold; applying an alternating voltage to the plurality electrodes thus forming alternating electric currents through the suspension thus causing accumulation of ceramic particles on at least one of the electrodes, the voltages being applied between 100-190 volts at 0.1-2000 kHz for 3-10 minutes; reducing the temperature of the suspension thus inducing the formation of ice crystals therein; removing the plurality of electrodes without having ceramic particles formed thereon; freezing the ceramics suspension until the suspension fluid is completely frozen; drying the frozen ceramic suspension into a porous accumulated state by exposing the ceramic particles to freeze drying conditions of the suspension fluid; sintering the ceramic particles into a solid architecture retaining a common final structure with the ceramic particles in the porous accumulated state; wherein: the particle size of the ceramic powder being approximately 1 μm; the suspension fluid is deionized water; and one of the electrodes is configured to act as a Cold-finger; reducing the temperature of the Cold-finger below the freezing point of the suspension by exposing the Cold-finger to liquid nitrogen fluid; and varying the size of the ice crystals and a freezing rate of the suspension fluid by varying a distance between the Cold-finger and the liquid nitrogen.

16. The method of forming variable density ceramic structures of claim 15, wherein:

the alternating voltages are applied for less than 5 minutes.

\* \* \* \* \*